(12) United States Patent
Yagisawa et al.

(10) Patent No.: US 6,851,499 B2
(45) Date of Patent: Feb. 8, 2005

(54) HINGED LID STRUCTURE FOR A VEHICLE

(75) Inventors: Katsuichi Yagisawa, Saitama (JP); Akira Komaki, Saitama (JP); Kengo Yano, Saitama (JP); Hiroshi Inaoka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/097,570

(22) Filed: Mar. 15, 2002

(65) Prior Publication Data
US 2002/0148665 A1 Oct. 17, 2002

(30) Foreign Application Priority Data

Mar. 23, 2001 (JP) ........................................ 2001-086442

(51) Int. Cl.[7] .............................................. B62D 61/02
(52) U.S. Cl. ........................ 180/219; 180/69.24; 49/138
(58) Field of Search ................................ 180/219, 69.2, 180/69.24; 49/137, 138, 379, 364; 220/335

(56) References Cited

U.S. PATENT DOCUMENTS

| | | | | |
|---|---|---|---|---|
| 4,426,752 A | * | 1/1984 | Nakayama | 16/82 |
| 4,782,978 A | * | 11/1988 | Appleby | 220/335 |
| 5,083,343 A | * | 1/1992 | Lee | 16/82 |
| 5,269,397 A | * | 12/1993 | Kawamoto | 188/290 |
| 5,483,396 A | * | 1/1996 | Son | 390/96.6 |
| 5,887,930 A | * | 3/1999 | Klein | 296/37.12 |
| 5,924,757 A | * | 7/1999 | Stapf | 296/97.22 |
| 6,428,075 B2 | * | 8/2002 | Kamemizu | 296/37.1 |

FOREIGN PATENT DOCUMENTS

| | | | | |
|---|---|---|---|---|
| JP | 4-362483 | * | 12/1992 | 180/225 |
| JP | 7-329830 | * | 12/1995 | B62D/25/12 |
| JP | 8-184254 | * | 7/1996 | E05F/3/20 |
| JP | 9-20277 | * | 9/1997 | B62J/9/00 |
| JP | 11-227658 A | | 8/1999 | |
| JP | 11-303490 A | | 11/1999 | |
| JP | 2002-331875 | * | 11/2002 | B60R/7/04 |

* cited by examiner

Primary Examiner—Daniel G. DePumpo
(74) Attorney, Agent, or Firm—Birch, Stewart, Kolasch & Birch, LLP

(57) ABSTRACT

A pair of arms extend from the lid for the oil filler port, and these arms are rotatably mounted on the vehicle body cover via the hinges. The hinge for supporting one of the arms is provided with a torsion spring for urging the lid in the opening direction, and the hinge for supporting the other arm is provided with a rotary damper for damping a speed of rotation of the lid. Since the hinged lid for a vehicle rotates smoothly in natural motion, which gives an upscale image, a hinged lid for a vehicle providing, for example, a feeling of operation suitable for the large scooter may be realized.

18 Claims, 24 Drawing Sheets

HINGED LID STRUCTURE FOR A VEHICLE

CROSS-REFERENCE TO RELATED APPLICATIONS

The present application claims priority under 35 USC 119 to Japanese Patent Application No. 2001-086442 filed on Mar. 23, 2001.

BACKGROUND OF THE INVENTION

1. Field of the Invention

The present invention relates to a hinged lid structure for a vehicle for closing a recess or an opening formed on a vehicle body cover of synthetic resin for covering the vehicle body frame with a hinged lid of synthetic resin.

2. Description of Background Art

A hinged lid structure for a vehicle is disclosed in (1) Japanese Patent Laid-Open No.303490/1999, entitled "Lid Device" and (2) Japanese Patent Lain-Open No.227658/1999, entitled "Fuel Lid Device for Scooter Type A vehicle."

The aforementioned invention (1) comprises, according to FIG. 2 of the patent publication, a lid portion 25, a pair of hinges 26 formed integrally with the lid portion 25 and a reinforcing member 29 being laid between the pair of hinges 26. The hinges 26 are rotatably mounted on the upper frame cover 17 with the lid portion 25 covering around the oil filler port 23.

The aforementioned invention (2) comprises, according to FIG. 3 in the patent publication, a hinge 27 is formed on the fuel lid 25. The hinge 27 is rotatably mounted on a boss 28 on a vehicle body cover 11. A spring member 29 is provided for urging the fuel lid 25 to the opening direction. A fuel lid 25 is provided for closing an opening 24 on the vehicle body cover 11.

However, the lid device of the aforementioned invention (1) has no mechanism for opening the lid portion 25. It is necessary to open the lid member to the fully opened position under the user's own power, and thus it takes a lot of trouble to open the lid portion 25.

The fuel lid device for scooter type a vehicle as in the aforementioned invention (2) comprises a spring member 29 for automatically opening the fuel lid 25 as a mechanism for opening the fuel lid 25. However, the fuel lid 25 pops up by a force of the spring member 29. Thus, the feeling of the operation sensed when opening the lid may be impaired.

In other words, it is desirable to make a lid open spontaneously, and to open and close the lid with moderate motion.

SUMMARY AND OBJECTS OF THE INVENTION

Accordingly, it is an object of the present invention to provide a structure for realizing a hinged lid for a vehicle that provides a feeling of operation suitable for a large scooter.

In order to achieve the aforementioned object, a first aspect of the present invention provides a hinged lid structure for a vehicle whereby a lid structure for closing a recess or an opening are formed on a vehicle body cover of synthetic resin for covering the vehicle body frame with a hinged lid of synthetic resin. A pair of arms extend from the hinged lid with the pair of arms being rotatably mounted on the vehicle body cover via hinges. A damper is attached on one of the hinges that supports one of the arms for damping a speed of rotation. A spring member is attached on the other hinge that supports the other arm for urging the lid in the opening direction.

Thus the spring member and the damper are separately provided in a compact manner. Further, a lid is realized that is capable of spontaneously opening and for opening and closing the lid with a moderate motion. In other words, when the lid is released, the lid is opened to the fully opened position spontaneously by the action of the spring member, and while it is being opened, a speed of rotation of the lid is damped by the damper.

Consequently, the lid rotates smoothly with a natural motion, which gives an upscale image. Thus a hinged lid for a vehicle is provided with a feeling of operation suitable, for example, for the large scooter.

A second aspect of the present invention provides for a rotary damper comprising a housing and a gear rotatably mounted on the housing, and an internal gear is formed on one of the arms about the axis of rotation thereof. The gear directly engaged with the internal gear and the housing is secured to the vehicle body cover.

The damper supports the rotary portion of the hinged lid for a vehicle by having an internal gear on one of the arms about the axis of rotation, directly engaging a gear with the internal gear, and securing the housing on the vehicle body cover. By enabling the damper to support the rotary portion of the hinged lid for a vehicle, the hinged lid structure for a vehicle may be simplified. In other words, the cost of the hinged lid for a vehicle may be reduced, and simultaneously, the number of steps required for assembling the hinged lid for a vehicle may be reduced as well.

A third aspect of the present invention provides that the hinge for supporting the other arm is secured to the vehicle body cover via a reinforcing plate.

As a result, rigidity of the hinge is improved by securing the hinge for supporting the other arm on the vehicle body cover via the reinforcing plate.

A fourth aspect of present invention provides a structure whereby the hinged lid is a lid for the oil filler port for covering the oil filler port of the fuel tank, and the recess or the opening is a oil filler tray section formed integrally with the vehicle body cover, and a pair of small through holes for passing the pair of left and right arms are formed on the oil filler tray section.

Since the pair of small through holes for passing the pair of arms are formed on the oil filler tray section, the through holes may be concealed from the outside with the lid for the oil filler port closed. Even when the lid for the oil filler port is opened, the through holes are nearly indistinguishable because they are small. Thus, the appearance of the portion around the lid for the oil filler port may be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
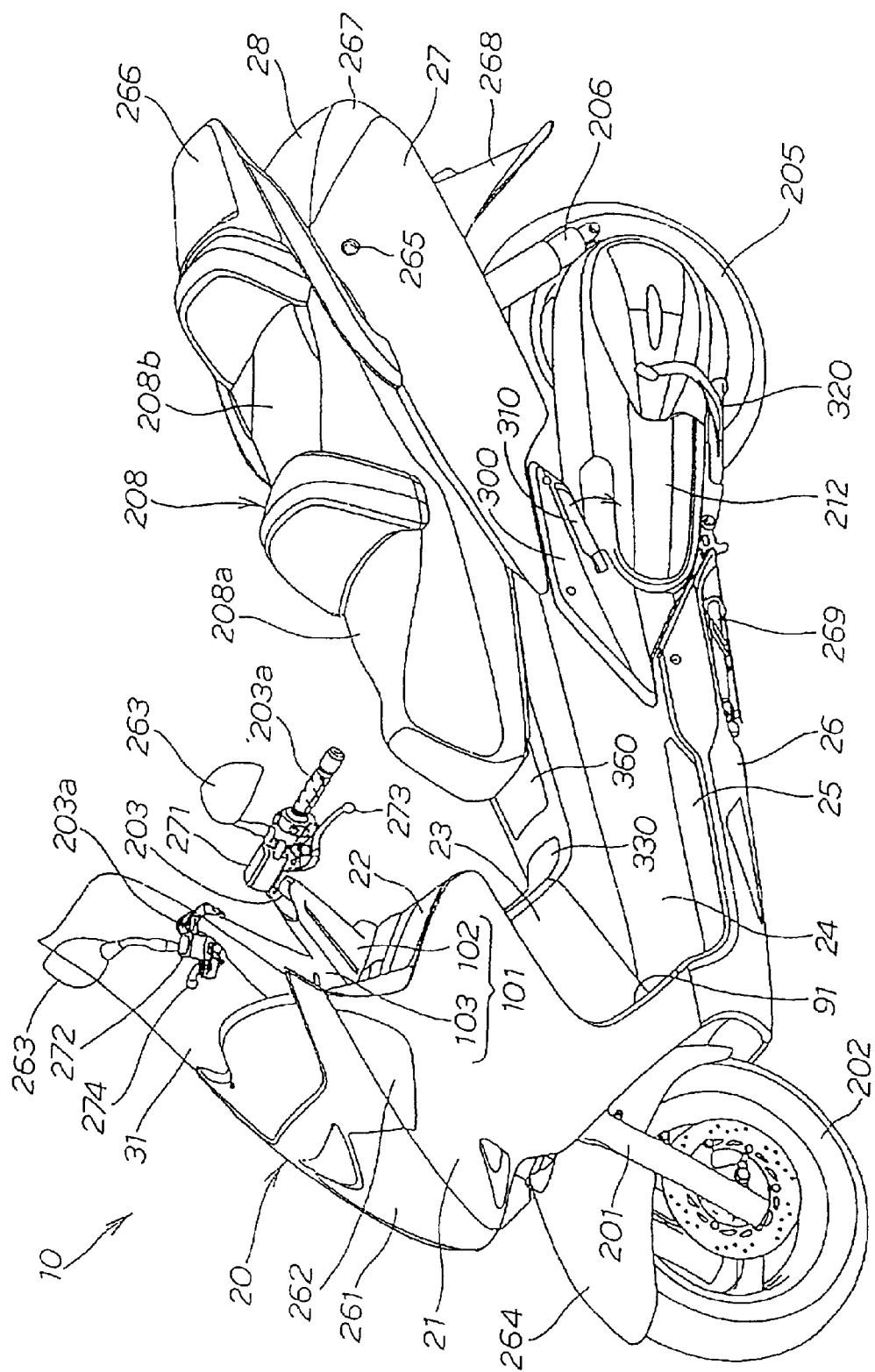
FIG. 1 is an outline view showing the left side of the motorcycle including a hinged lid structure for a vehicle according to the present invention mounted thereon.

Referring now to the drawings, an embodiment of the present invention will be described below. The terms "front," "rear," "left," "right," "upper" and "lower" represent the direction viewed from the driver.

FIG. 1 is an outline view showing the left side of the motorcycle including a hinged lid structure for a vehicle according to the present invention mounted thereon, and the motorcycle 10 as a scooter type vehicle is shown to be a vehicle having a low deck floor 25.

A vehicle body cover 20 for covering the entire vehicle body frame of the motorcycle 10 comprises a front cowl 21 for covering the front portion of the vehicle body frame that will be described later and the upper portion of the front wheel. An upper cover 22 is provided for covering the upper opening of the front cowl 21. An inner cover 23 covers the rear portion of the front cowl 21. A center cover 24 extends rearwardly from the rear end of the inner cover 23 for covering the longitudinal center of the vehicle body frame. A low deck floor 25 extends outwardly from the outer edge of the lower end of the center cover 24 for positioning the feet of the driver. A floor skirt 26 extends downwardly from the outer edge of the low deck floor 25. A rear side cover 27 extends rearwardly from the center cover 24 for covering the rear side portion of the vehicle body frame. A rear cover 28 extends rearwardly from the rear end of the rear side cover 27 for covering the rear portion of the vehicle body frame.

The front cowl 21 is provided with a transparent windscreen 31 thereon. The inner cover 23 is provided with a leg shield 91 for covering the front portion of the driver's legs.

The motorcycle 10 further comprises a handle 203 at the front of the vehicle body, and a seat 208 and a step holder 300 at the rear of the vehicle body.

The handle 203 has a similar configuration as the so-called chopper-type handle, having grips 203a, 203a at relatively high positions that extend rearwardly. The handle 203 is covered by a handle cover 101. The handle cover 101 comprises a lower handle cover 102 for covering the lower portion of the handle 203 on the left and right side, and an upper handle cover 103 for covering the upper portion of the handle 203.

The seat 208 is a double seat comprising a front portion of the seat 208a for a driver and the rear portion of the seat 208b for an occupant. The step holder 300 is disposed adjacent the rear portion of the center cover 24 and is provided with a pillion step for placing the occupant's foot (step for occupant) 310 mounted in such a manner that it can be stored and exposed.

In FIG. 1, a headlamp 261, a blinker 262, mirrors 263, 263, a front fender 264, a seat lock 265, a rear air spoiler 266, a tail lamp 267, a rear fender 268, an auxiliary stand 269, and a main stand 320 are operatively connected together.

Master cylinders 271, 272 are provided for generating a liquid pressure for braking by the operation of brake levers 273, 274.

Figure 2:
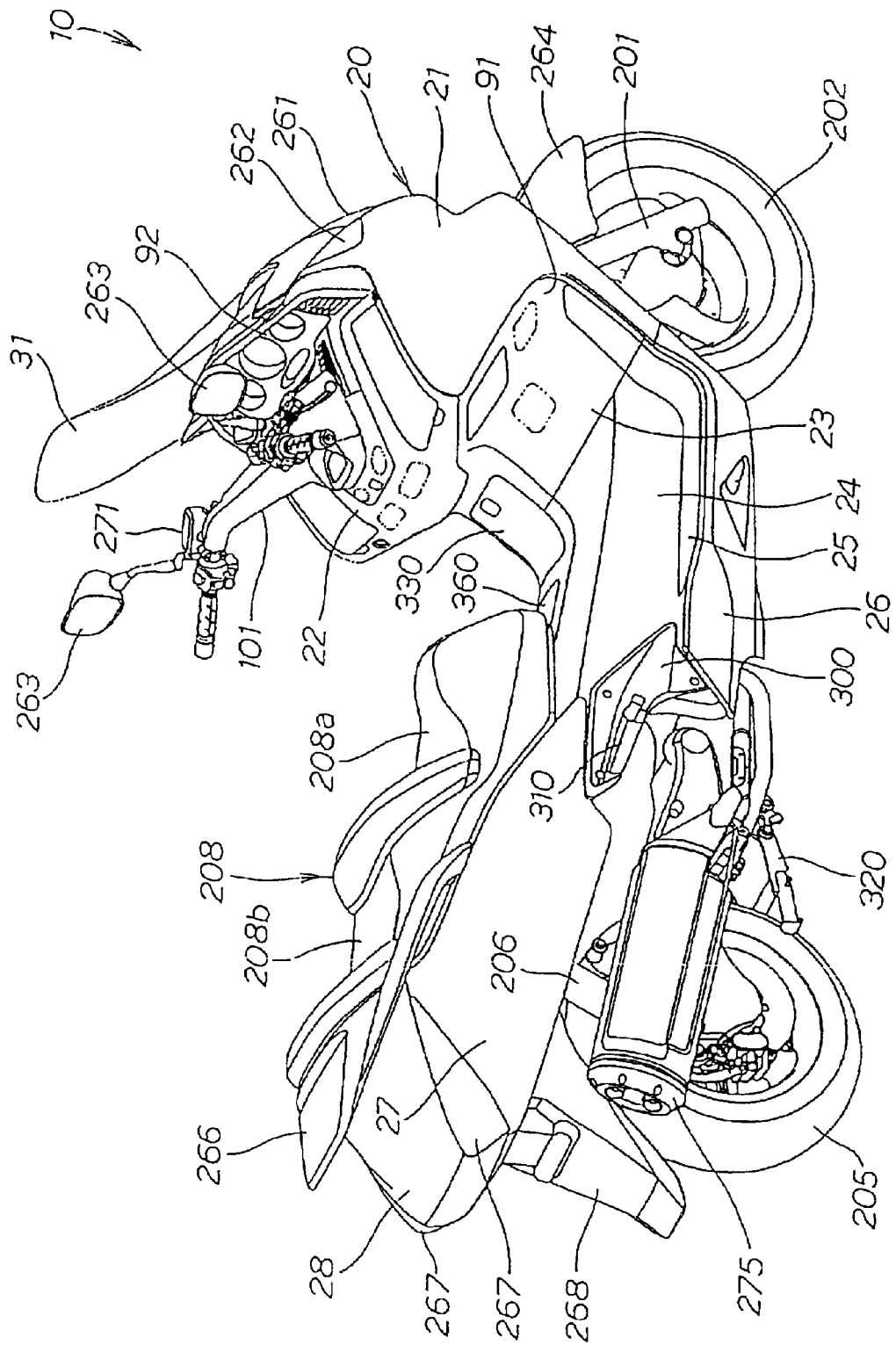
FIG. 2 is an outline view showing the right side of the motorcycle including a hinged lid structure for a vehicle according to the present invention mounted thereon.

FIG. 2 is an outline view showing the right side of the motorcycle including a hinged lid structure for a vehicle according to the present invention mounted thereon, showing a meter panel 92 provided above the front cowl 21 behind the windscreen 31. As is clear from the description given so far, the front portion of the vehicle body may be provided with the windscreen 31, the leg shield 91, and the meter panel 92.

FIG. 2 further shows that another step holder 300 having another pillion step 310 is provided on the right side of the motorcycle 10 as well. The reference numeral 275 designates an exhaust muffler.

Figure 3:
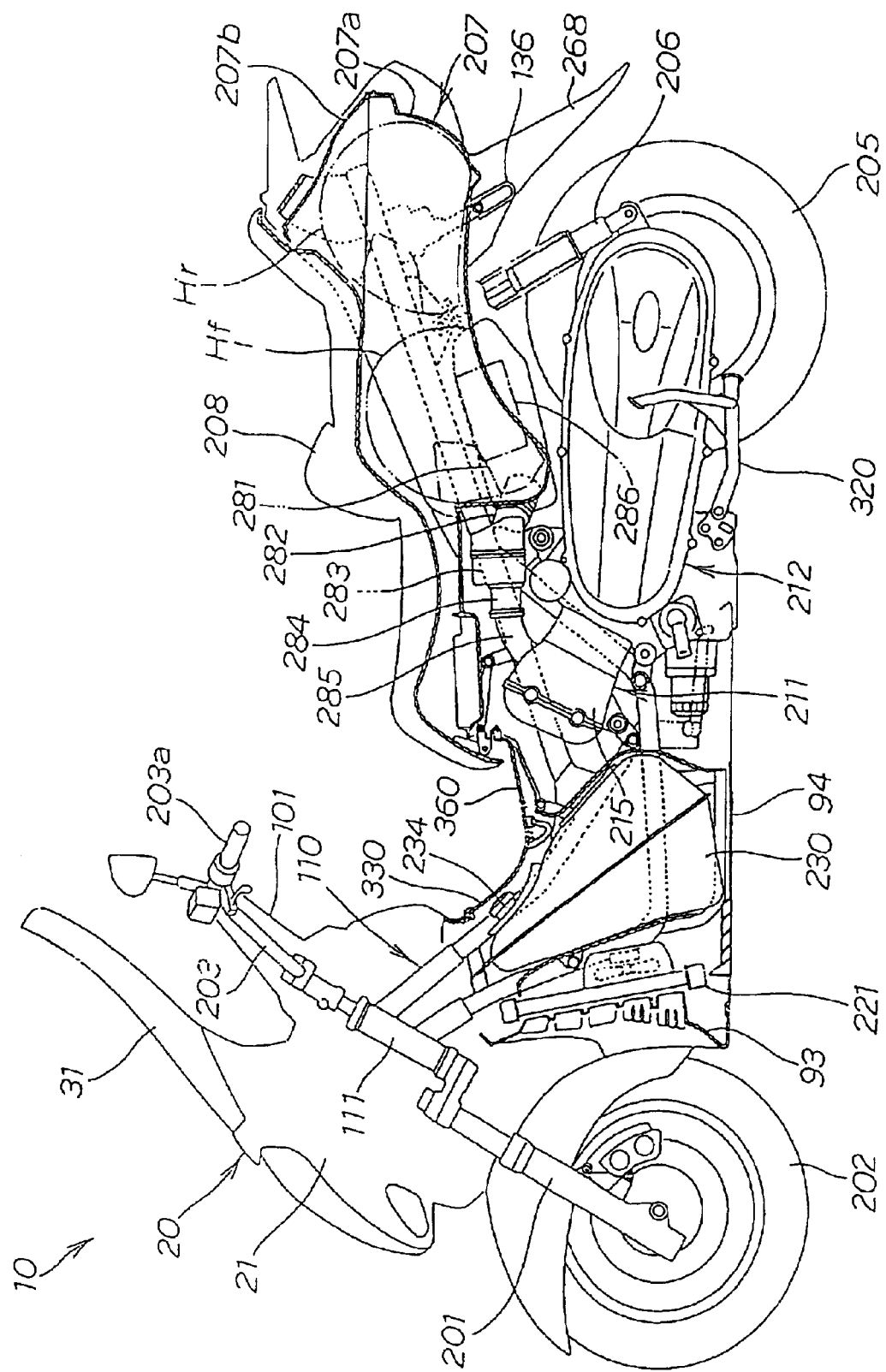
FIG. 3 is a sectional side elevation of the motorcycle including a hinged lid structure for a vehicle according to the present invention mounted thereon.

FIG. 3 is a sectional side elevation of the motorcycle including a hinged lid structure for a vehicle according to the present invention mounted thereon, viewed from the left side of the motorcycle 10.

The motorcycle 10 is a scooter type vehicle mainly comprising a vehicle body frame 110, a front fork 201 mounted on the head pipe 111 of the vehicle body frame 110 so as to be capable of a lateral swinging motion. A front wheel 202 is mounted on the front fork 201 with the aforementioned handle 203 connected to the front fork 201. An engine 211 is mounted on the rear portion of the vehicle body flame 110. A power transmission mechanism 212 is capable of a vertical swinging motion about a crankshaft of the engine 211 with a rear wheel 205 mounted on the rear portion of the power transmission mechanism 212. A rear cushion unit 206 suspends the rear end portion of the power transmission mechanism 212 from the vehicle body frame 110. A storage box 207 is mounted over the rear portion of the vehicle body frame 110 with the aforementioned seat 208 arranged on the storage box 207 so as to be hinged.

The front fork 201 is a fork in the shape of an inverted angular U disposed below the head pipe 111. The upper portion of the front fork 201 and the head pipe 111 are covered by the front cowl 21.

The engine 211 is a water-cooled 2-cylinder engine slightly inclined with two cylinder heads 215 on the left and right sides facing toward the upper front, and disposed substantially horizontally. The power transmission mechanism 212 is a belt converter non-stage transmission with a centrifugal clutch in which the power of the engine 211 is transmitted to the rear wheel 205.

The storage box 207 is a box elongated in the direction along the length of the vehicle body so that two helmets Hf, Hr can be stored in tandem, and comprises a lower box 207a and an upper box 207b placed on the rear portion of the lower box 207a.

In FIG. 3, an air cleaner 281, a connecting tube 282, an air chamber 283, a throttle valve 284, an inlet pipe 285, a battery 286 are operatively mounted on the vehicle frame.

Figure 4:
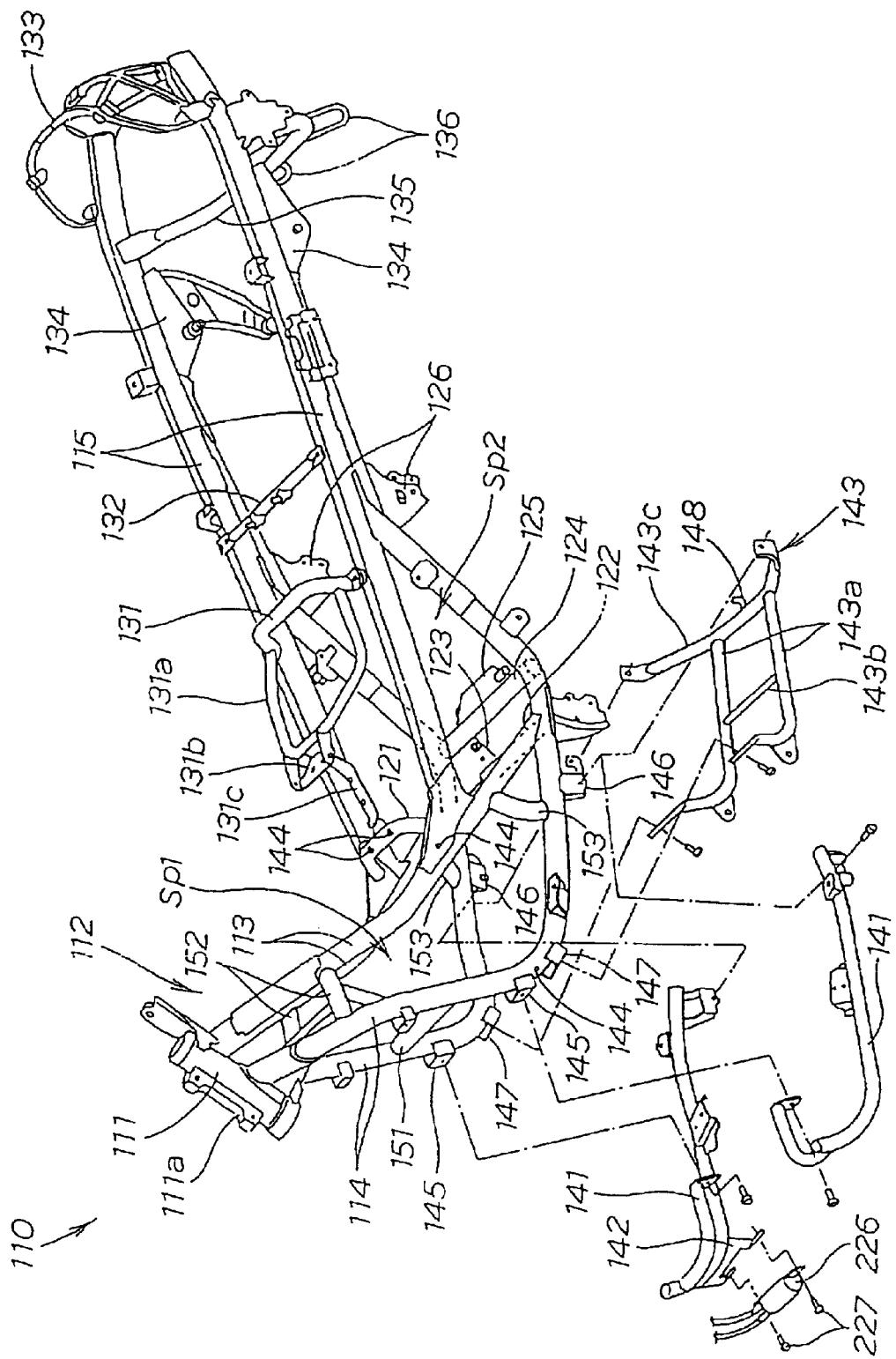
FIG. 4 is a perspective view of the vehicle body frame employing a hinged lid structure for a vehicle according to the present invention.

FIG. 4 is a perspective view of the vehicle body frame employing a hinged lid structure for a vehicle according to the present invention. The vehicle body frame 110 is a double cradle type integral frame comprising a front frame 112 continuing to the head pipe 111 and a pair of left and right rear frames 115, 115 extending rearward from the rear portion of the front frame 112 joined by welding. The head pipe 111 is provided with a cowl stay bracket 111a.

The front frame 112 comprises a pair of left and right upper frames 113, 113 extending downwardly toward the rear from the head pipe 111, a pair of left and right down tubes 114, 114 extend downwardly from the head pipe 111 at the position below the pair of upper frames 113, 113, and the pair of down tubes 114, 114 extend rearwardly from the lower ends thereof and being connected to the lower ends of the pair of upper frames 113, 113, and then further extending upwardly toward the rear. With the front frame 112 of such a construction, a space Sp1 of a substantially triangle shape in side view is defined by a pair of upper frames 113, 113 and a pair of down tubes 114, 114.

A first cross member 121 in the shape of an inverted angular U in front view is laid between the front end of a left rear frame 115 and the front end of a right rear frame 115, a second cross member 122 is laid between the lower end of the left upper frame 113 and the lower end of the right upper frame 113, and a first engine bracket 123 is connected to the second cross member 122 at the center of the vehicle width.

A third cross member 124 is laid between the rear end of the horizontal portion of the left down tube 114 and the rear end of the horizontal portion of the right down tube 114, a second engine bracket 125 is connected to the third cross member 124 at the center of the vehicle width, and the left and right third engine brackets 126, 126 are connected to rear ends of the left and right down tubes 114, 114.

The pair of left and right rear frames 115, 115, each being a member of vertically elongated cross section, are connected at one of the ends to the midsections along the lengths of the pair of left and right upper frames 113, 113, and extend rearwardly from the other ends thereof. The "vertically elongated cross section" here means a cross section of which the longitudinal dimension is larger than the lateral dimension. More specifically, the rear frames 115, 115 are formed of a square pipe of vertically elongated rectangular cross section.

The heat shielding structure of the fuel tank includes three cross members 131 to 133 that are detachably laid between the pair of left and right rear frames 115, 115. More specifically, a frontmost rear cross member 131, a middle rear cross member 132, and a rearmost rear cross member 133 are laid between the left and right rear frames 115, 115 in this order from the front.

These three cross members 131 to 133 are placed on the upper surface of the rear frames 115, 115 and are secured with bolts. Since the rear frames 115, 115 are made of a square pipe, it is easy to place and attach these three cross members 131 to 133 thereon.

The frontmost rear cross member 131 is a member in the shape of an inverted angular U a in front view, having a U-shaped stay 131a opening toward the rear in plan view and extending forwardly from the left and right standing portions. A seat hinge supporting portion 131b is connected to the front end of the U-shaped stay 131a and an extension member 131c is connected to the front end of the U-shaped stay 131a so as to extend forward. The extension member 131c is secured at the front end thereof to the first cross member 121 with a bolt. The middle rear cross member 132 is a bar-shaped member, to which the seat catch member, which is not shown, for supporting the seat 208 (See FIG. 3) in the closed state is attached. The rearmost rear cross member 133 is formed of die casting aluminum and is a U-shaped band member opening toward the front in plan view.

The increase in lateral rigidity of the rear frames 115, 115 in the case where the rear ends of the rear frames 115, 115 are connected by attaching the rearmost rear cross member 133 thereon with bolts is prevented to provide a good effect on the ride quality. The rearmost rear cross member 133 is provided with a seat catch member, which is not shown, for holding the seat 208 in the closed state as well. In other words, in this arrangement, the seat hinge 208c or the seat catch can be detached from the vehicle body frame 110 together with the cross members 131 to 133 by removing the bolts tightened thereon.

The left and right rear frames 115, 115 are also provided with left and right cushion brackets 134, 134 connected at the rear portion thereof, and a lower rear cross member 135 of substantially U-shape in a front view is laid and welded between the rear portions of the left and right rear frames 115, 11. Then, left and right carrier hooks 136, 136 are connected to the lower rear cross member 135.

Employing U-shaped member as a lower rear cross member 135 contributes to preventing an increase in a lateral rigidity in association with the connection between the rear portions of the rear frames 115, 115 to thus improve the ride quality.

FIG. 4 also shows that a pair of left and right floor supporting stays 141, 141 and an under frame 143 are detachably mounted on the aforementioned vehicle body frame 110, and a plurality of headed pins 144 . . . (" . . . " designates plural number, hereinafter) are mounted thereon.

More specifically, the left and right floor supporting stays 141, 141, are members for supporting the low deck floor 25 (See FIG. 1) that are to be attached to the brackets 145, 145, 146, 146 of the left and right down tubes 114, 114 with bolts.

The right floor supporting stay 141 is a member comprising an ignition coil 226 for the engine detachably attached under the front end thereof via a stay 142 with bolts 227, 227. The ignition coil 226, attached under the down tube 114, is to be arranged below the level of the low deck floor 25.

The under frame 143 is a member laid between the horizontal portions of the left and right down tubes 114, 114 so as to be suspended therefrom, and is to be attached to the brackets 146, 146, 147, 147 of the down tubes 114, 114 with bolts.

The under frame 143 in such a construction comprises left and right side members 143a, 143a extending along the horizontal portions of the down tubes 114, 114, a central cross member 143b laid between the elongated central portions of the side members 143a, 143a, and a rear cross member 143c laid between the rear ends of the side members 143a, 143a. A hook 148 is provided for hooking a heat shielding plate for the fuel tank, which will be described later.

The headed pins 144 . . . are members for hooking the heat shielding plate for the fuel tank, that will be described later, and six of those in total are provided at the outside portions of the left and right upper frames 113, 113 and of the left and right down tubes 114, 114, and on the front portion of the first cross member 121 on the left and right positions. In FIG. 4, a front cross member 151 is provided together with stays 152, 152, 153.

Figure 5:
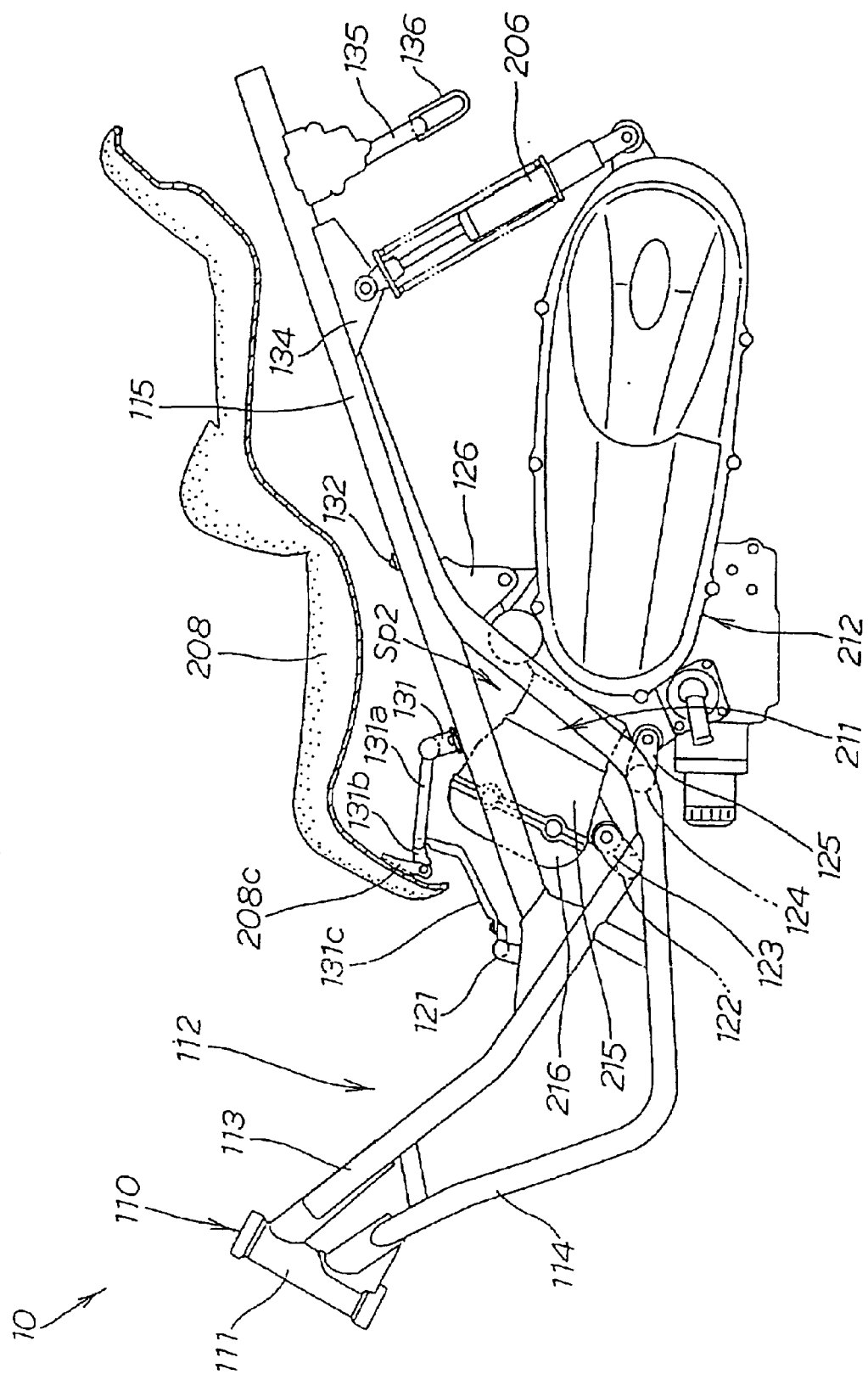
FIG. 5 is a left side view of the vehicle body frame employing the hinged lid structure for a vehicle according to the present invention with an engine, a power transmission mechanism, and a seat mounted thereon.

FIG. 5 is a left side view of the vehicle body frame employing the hinged lid structure for a vehicle according to the present invention with an engine, a power transmission mechanism, and a seat mounted thereon. FIG. 5 illustrates a state in which the engine 211 and the power transmission mechanism 212 are arranged rearwardly of the front frame 112 and downwardly of the pair of rear frames 115, 115. The engine 211 is attached in the vicinity of the connecting portions between the front frame 112 and the left and right rear frames 115, 115 (only the left one of them is shown in the figure, hereinafter).

More specifically, a space Sp2 of substantially triangular in side view is defined by the pair of upper frames 113, 113, the pair of down tubes 114, 114. The pair of rear frames 115, 115 is provided at the rear of the front frame 112. A cylinder head 215 and a head cover 216 of the engine 211 are arranged in the space Sp2. The lower front portion of the engine 211 is attached to the first engine bracket 123, the lower rear portion of the engine 211 is attached to the second engine bracket 125, and the upper rear portion of the engine 211 is attached to the third engine brackets 126, 126. The frontmost and middle rear cross members 131, 132 are arranged above the engine 211.

FIG. 5 also shows that (1) the rear end portion of the power transmission mechanism 212 is suspended by the left and right shock absorber brackets 134, 134 via the left and right rear shock absorber units 206, 206, and (2) the frontmost rear cross member 131 also serves as a member for supporting the seat hinge 208c of the hinged seat 208. In this way, the rear cushion units 206, 206 and the seat 208 can be supported by the rear frames 115, 115.

Figure 6:
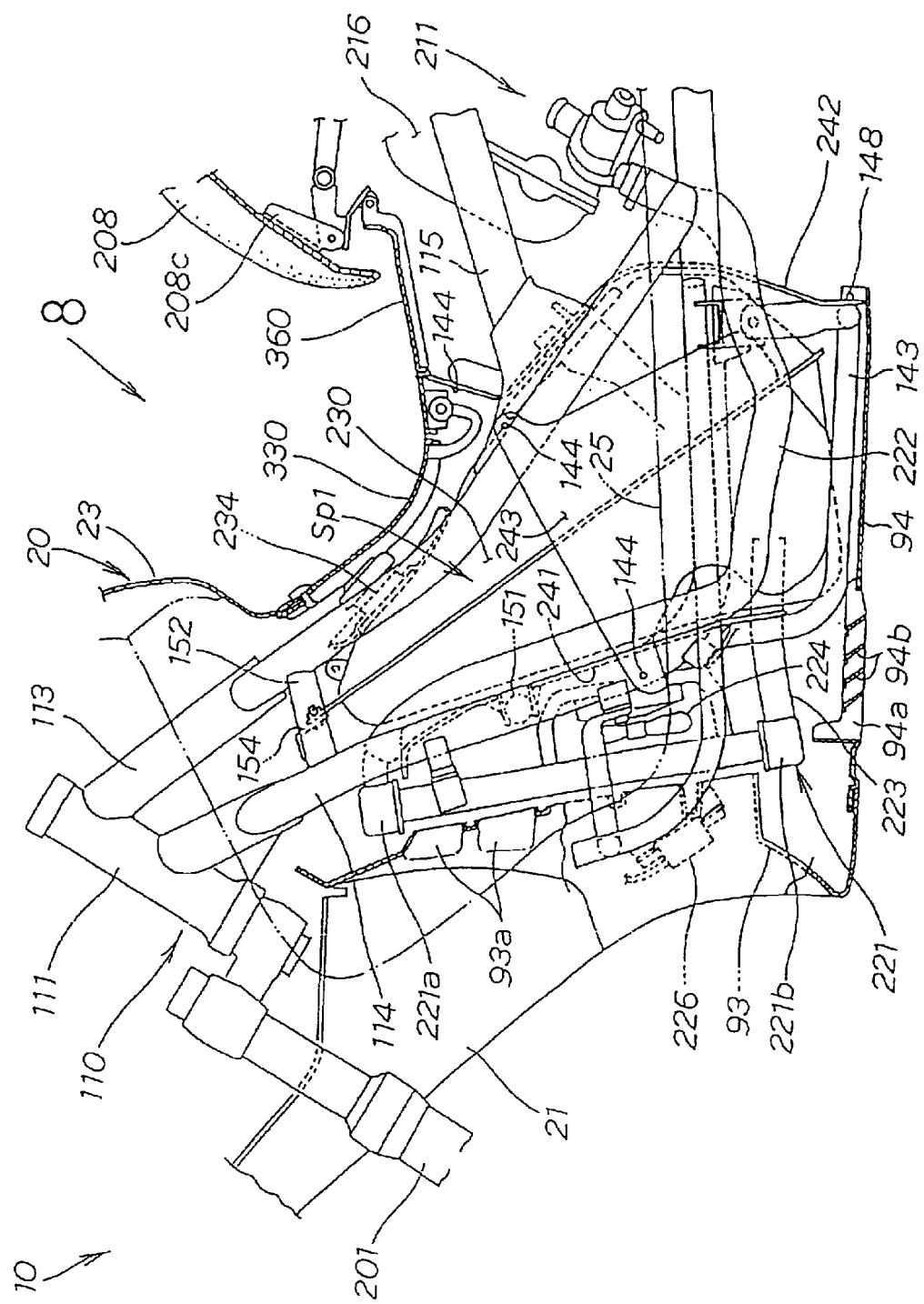
FIG. 6 is a sectional side elevation of the front lower portion of the motorcycle including a hinged lid structure for a vehicle according to the present invention mounted thereon.

FIG. 6 is a sectional side elevation of the front lower portion of the motorcycle including a hinged lid structure for a vehicle according to the present invention mounted thereon, viewed from the left side of the motorcycle 10, showing a state in which the engine 211 is disposed at the rear of the low deck floor 25 shown in phantom, a radiator 221 for cooling the engine is disposed at the front of the floor 25, the ignition coil 226 is disposed under the front portion of the floor 25, and the fuel tank 230 is disposed between the engine 211 and the radiator 221.

In other words, the radiator 221 is disposed forwardly of the engine 211 and of the left and right down tubes 114, 114 (only the left one of them is shown in the figure, hereinafter).

The return pipe 222 for returning the coolant from the engine 211 to the radiator 221 is a hose passing along the left side (the near side of the figure) of the vehicle body with respect to the center of the vehicle width. More specifically, the return pipe 222 is connected to the liquid return port of the engine 211 and extends along the horizontal portion of the left down tube 11 and then the vertically extending portion at the front thereof, and is connected to the upper header 221a of the radiator 221.

On the other hand, the feed pipe 223 for feeding the coolant from the radiator 221 to the engine 211 is a hose passing along the right side (the far side in the figure) of the vehicle body with respect to the center of the vehicle width. More specifically, the feed pipe 223 connected to the lower header 221b of the radiator 221 extends rearwardly along the horizontal portion of the right down tube 114 (on the far side in the figure) and is connected to the liquid port of the engine 211. A radiator fan 224 is operatively mounted on the vehicle frame.

The ignition coil 226 is characterized by being arranged on the right side opposite from the return pipe 222 with respect to the center of the vehicle width (the far side in the figure) and forwardly of the radiator 221.

In this way, the ignition coil 226 may be disposed at the position which is free from (1) thermal effect from the engine 211, (2) thermal effect from the exhaust air from the radiator 221, and (3) thermal effect from the return pipe 222.

The fuel tank 230 is disposed in the space Sp1 of a substantially triangular shape in side view as defined by the pair of left and right upper frames 113, 113 and the pair of left and right down tubes 114, 114. The fuel tank 230 is a container having such a configuration that the upper front is tapered along the upper frames 113, 113 and the down tubes 114, 114 when viewed from the side of the vehicle body as shown in FIG. 6 in order to utilize the space Sp1 for an effective arrangement. In addition, in order to increase the volume of the fuel tank 230, the lower portion thereof extends downwardly to the level below the down tubes 114, 114. The fuel tank 230 may be protected by covering the lower portion of the fuel tank 230 extending downwardly to the level below the down tubes 114, 114 with the detachable under frame 143.

The under frame 143 is mounted to the vehicle body frame 110 after the fuel tank 230 is inserted and attached into the space Sp1 from below the vehicle body frame 110.

Figure 7:
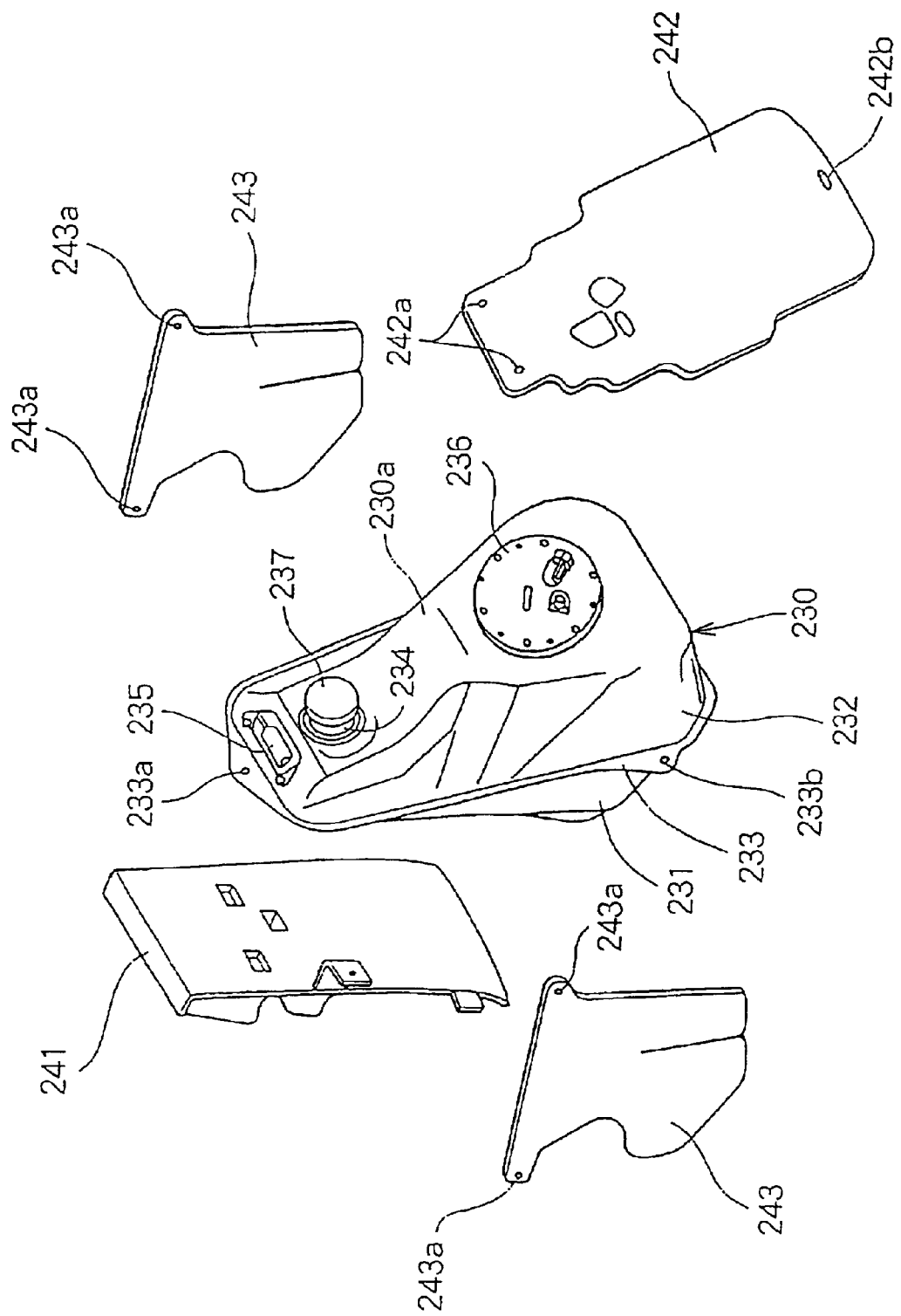
FIG. 7 is a perspective view of the fuel tank and the parts thereabouts of the motorcycle including a hinged lid structure for a vehicle according to the present invention mounted thereon.

FIG. 7 is a perspective view of the fuel tank and the parts of the motorcycle including a hinged lid structure for a vehicle according to the present invention mounted thereon.

The fuel tank 230 is an integrated container formed by superimposing the lower half tank 231 to be located at the lower front half thereof and the upper half tank 232 to be located at the upper rear half thereof and joined at the flange 233 portion. An oil filler port 234 is provided on an inclined upper surface 230a. A sub-tank 235 is provided for a breather. A fuel feed pump 236 is operatively mounted relative to the fuel tank. More specifically, the sub-tank 235 for a breather, the oil filler port 234, and the fuel feed pump 236 are arranged on the upper portion of the fuel tank 230 in this order from the front.

The flange 233 includes a mounting hole 233a at the center of the upper portion and two mounting holes 233b each on the left and right lower portions (only one of the holes on the left is shown in FIG. 7). The oil filler port 234 comprises a seal cap 237. The sub-tank 235 for a breather is a small container in communication with the inside of the fuel tank 230.

The heat shielding structure of the fuel tank comprises a heat shielding plate for preventing a thermal effect from the engine 211 and the radiator 221 (See FIG. 6) divided into four members represented by the reference numerals 241, 242, 243, 243. The divided heat shielding plates 241, 242, 243, 243 are arranged on the front surface, the rear surface, the left surface, and the right surface of the fuel tank 230 respectively.

Since the divided heat shielding plates 241, 242, 243, 243 are employed, the extent of thermal effect from the engine 211 or from the radiator 221 can be taken into consideration. Thus, their size may be arbitrarily minimized depending on the configuration of each surface of the fuel tank 230. As a result, each heat shielding plate 241, 242, 243, 243 may be relatively small in size, and may be manufactured extremely easily. In addition, since the molding die may be small in size and thus it requires only a small amount of material, the manufacturing cost may be reduced as well.

The front shielding plate 241 covering the front surface of the fuel tank 230 is a resin sheet of a hard resin or the like that is substantially square in front view. Since the front heat shielding plate 241 is formed of a resin sheet, it is very simple in shape and may thus be manufactured at a lower cost.

The rear heat shielding plate 242 covering the rear surface of the fuel tank 230 is a rubber sheet formed in a substantially square shape, and comprises two hooking holes 242a, 242a at the upper left and right corners thereof, and one hooking bole 242b at the bottom thereof.

The left and right heat shielding plates 243, 243 for covering the lower half portion of the left surface and the lower half portion of the right surface of the fuel tank 230 are formed of rubber sheets having two hooking holes 243a, 243a at the upper left and right corners thereof.

As described above, the rear heat shielding plate 242 and the left and right heat shielding plates 243, 243 are freely deformable and freely arranged depending on the space around the fuel tank 230 because they are formed of rubber sheets. It can also be arranged easily using a small space around the fuel tank 230 effectively. In addition, since the rear heat shielding plate 242 and the left and right heat shielding plates 243, 243 are formed of sheets, they may be very simple in shape and may be manufactured at lower cost.

Referring back to FIG. 6, the description will be continued.

The front heat shielding plate 241 is a member which also serves as a cooling air guide of the radiator 221 by being disposed between the down tube 114 extending downwardly from the head pipe 111 and the fuel tank 230, and being detachably mounted on the front cross member 151. Therefore, the upper end of the front heat shielding plate 241 is curved toward the upper portion of the radiator 221, and the lower end of the front heat shielding plate 241 extends to the level below the radiator 221.

As described above, since the front heat shielding plate 241 is disposed between the down tube 114 and the fuel tank 230, the front heat shielding plate 241 can easily be mounted to the down tube 114. Therefore, the efficiency of the mounting operation of the front heat shielding plate 241 is ensured.

The rear heat shielding plate 242 can be detachably mounted on the vehicle body frame 110 by hooking the upper portion on the headed pin 144, and hooking the lower portion on the hook 148.

The left and right heat shielding plates 243, 243 (only the left one is shown in FIG. 6) can be detachably mounted on the vehicle body frame 110 by hooking the upper portion on the headed pin 144 . . . .

As is clear from the description given so far, since the divided heat shielding plates 241, 242, 243, 243 are employed, each heat shielding plate 241, 242, 243, 243 can be mounted freely on the vehicle body frame 110 after the fuel tank 230 is mounted on the vehicle body frame 110 (vehicle body), and thus the efficiency of mounting operation is ensured.

FIG. 6 shows that the front lower cover 93 covers the front portion of the radiator 221 and the under cover 94 covers the lower portion of the radiator 221 and of the fuel tank 230.

The front lower cover 93 extends to the front end of the under cover 94 and is provided with a plurality of cooling air ports 93a . . . for radiator on its front surface.

The under cover 94 is provided with an exhaust air port 94a below the fan 224 for exhausting the exhaust air of the radiator 221 outwardly. The exhaust air port 94a is provided with a number of louvers (current plates) 94b . . . facing toward the upper rear.

FIG. 6 also shows that the vehicle body cover 20 is provided with a lid 330 for the oil filler port that is to be opened when filling fuel via the oil filler port 234 into the fuel tank 230, and a lid 360 for inspection that is to be opened when the ignition plug (not shown) of the engine 211 is inspected.

Figure 8:
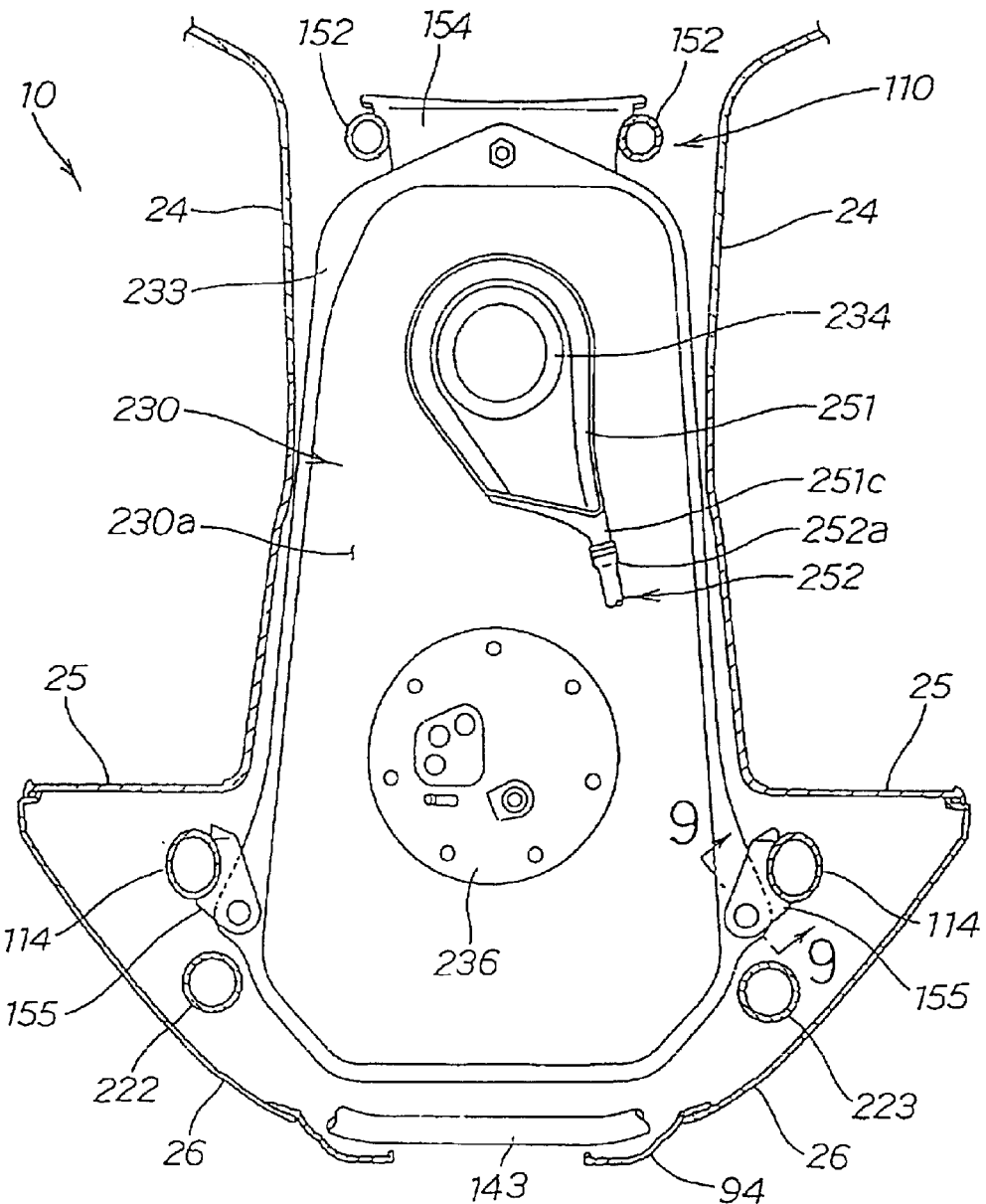
FIG. 8 is a drawing viewed in the direction shown by the arrow 8 in FIG. 6.

FIG. 8 shows a mounting structure of the fuel tank 230 on the vehicle body frame 110, viewing in the direction shown by the arrow 8 in FIG. 6.

The vehicle body frame 110 is formed by laying the upper bracket 154 between the left and right stays 152, 152, and mounting the lower brackets 155, 155 at the left and right down tubes 114, 114. The fuel tank 230 can be mounted detachably on the vehicle body frame 110 by securing the upper portion of the flange 233 of the fuel tank 230 to the upper bracket 154 with a bolt, and securing the lower portion of the flange 233 to the lower brackets 155, 155 with bolts. The upper portion of the flange 233 is tightly secured to the upper bracket 154 with a bolt.

Figure 9:
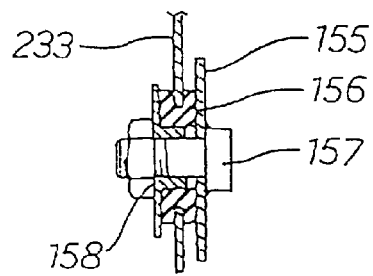
FIG. 9 is a cross sectional view taken along the line 9—9 in FIG. 8.

FIG. 9 is a cross sectional view taken along the line 9—9 in FIG. 8, and showing a state in which the lower portion of the flange 233 is rubber-mounted to the lower bracket 155 with a bolt and a screw nut 157 via a rubber bush 156. A collar 158 is mounted relative thereto.

Figure 10:
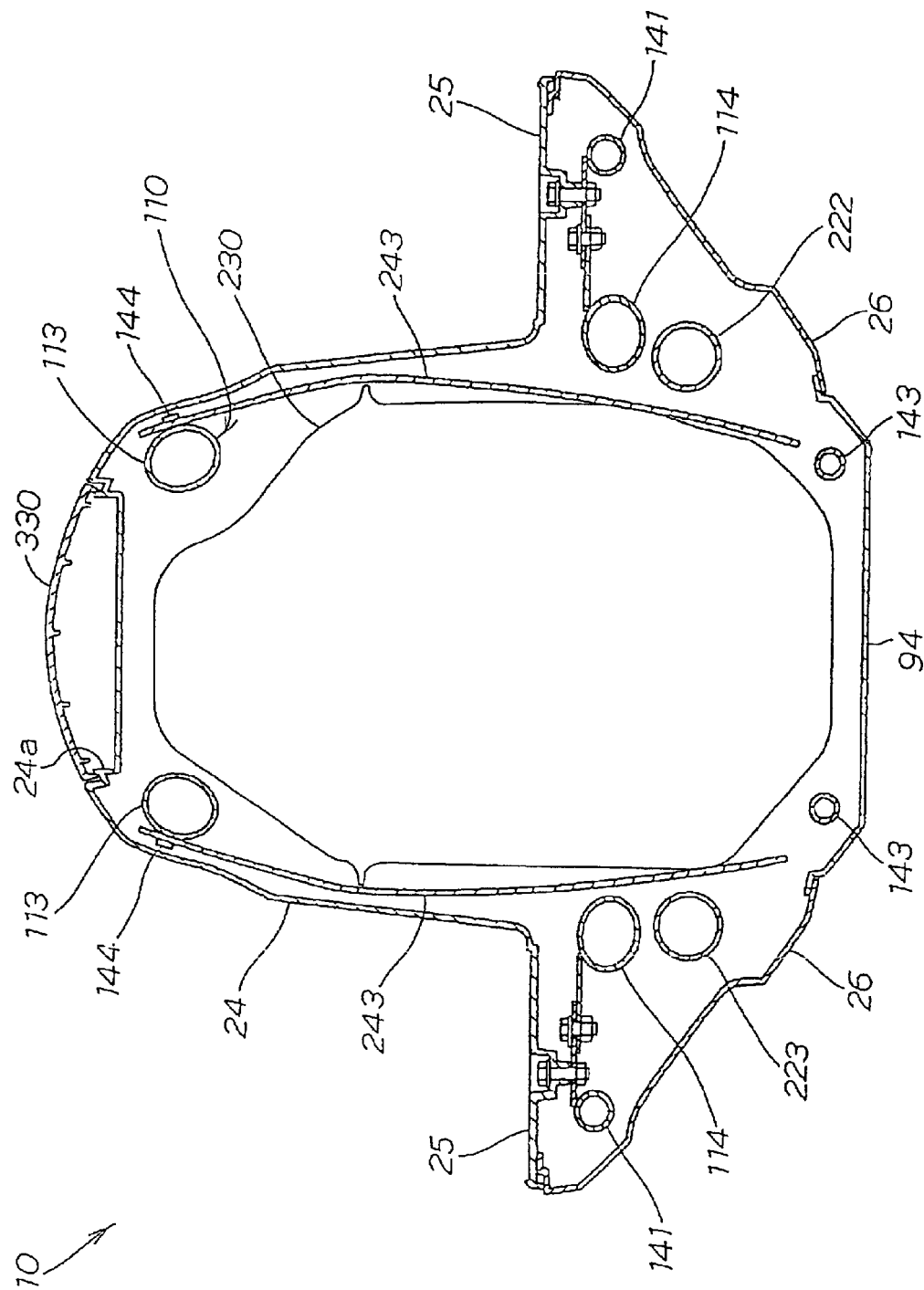
FIG. 10 is a front cross section of a motorcycle including a hinged lid structure for a vehicle according to the present invention mounted thereon.

FIG. 10 is a front cross section of a motorcycle including a hinged lid structure for a vehicle according to the present invention mounted thereon, showing a state in which (1) the vehicle body frame 110 and the fuel tank 230 are covered by the center cover 24, the left and right low deck floors 25, 25, the left and right floor skirts 26, 26, and the under cover 94, and (2) the floors 25, 25 are secured to the left and right down tubes 114, 114 via the floor supporting stays 141, 141 with bolts.

As described above, the left and right heat shielding plates 243, 243 are hooked on the headed pins 144 . . . extending downwardly alongside the fuel tank 230, and extend through the gaps between the side surfaces of the fuel tank 230 and the down tubes 114, 114. As is described thus far, since the upper portions of the left and right heat shielding plates 243, 243 must simply be hooked on the vehicle body frame 110, it can be mounted in a very simple manner.

Figure 11:
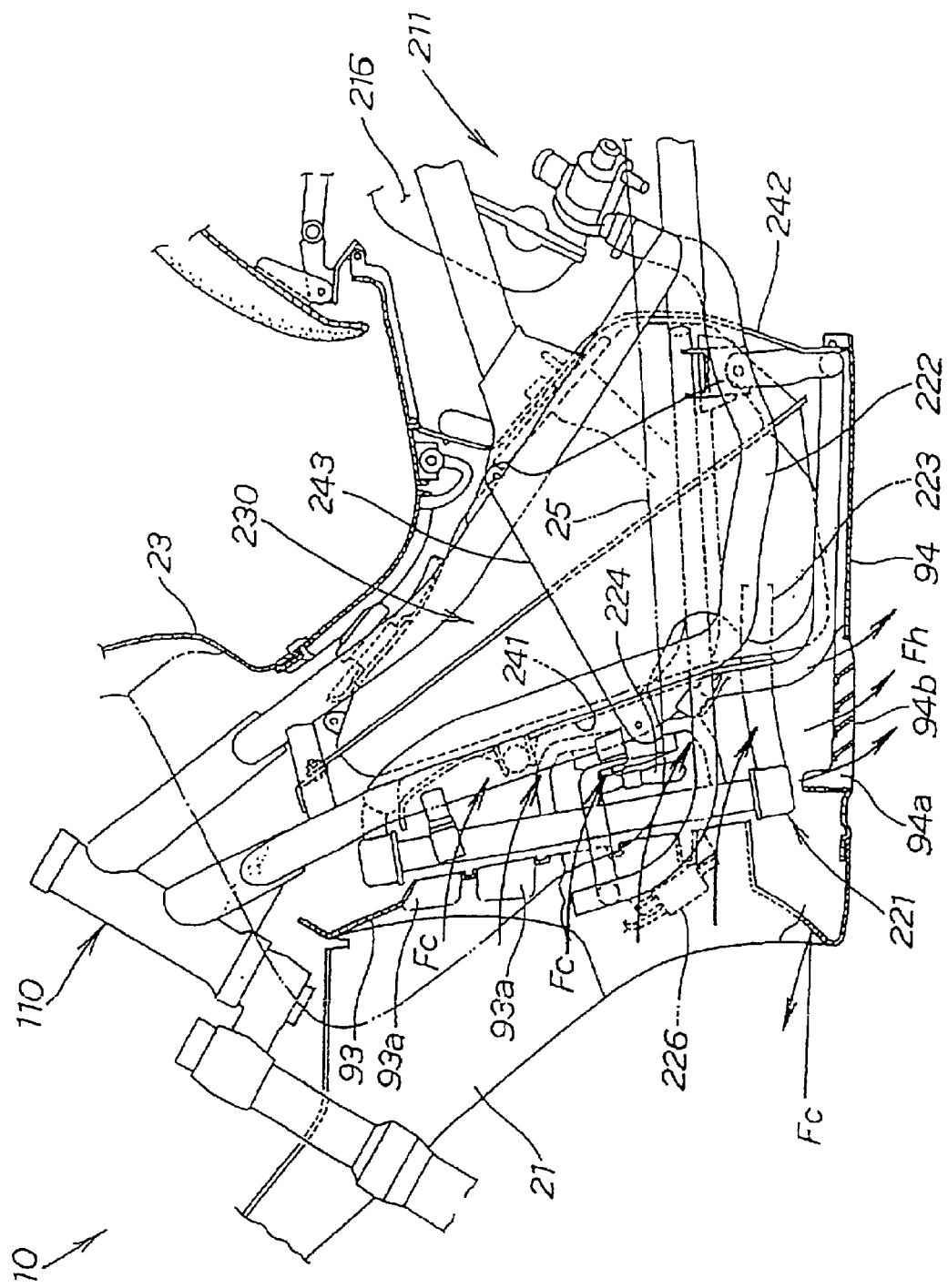
FIG. 11 is a drawing showing an action of the radiator and the parts thereabouts of the motorcycle including a hinged lid structure for a vehicle according to the present invention mounted thereon.

FIG. 11 is a drawing showing an action of the radiator and the parts therearound of the motorcycle including a hinged lid structure for a vehicle according to the present invention mounted thereon. A fan 224 located behind the radiator 221 introduces air from the front of the radiator 221. Therefore, the outside air is introduced into the cooling air induction ports for the radiator 93*a* . . . as cooling air (including air blowing on the vehicle during travel) Fc, and flows through the cooling air passage into the radiator 221.

Hot air coming out from the radiator 221 (exhausted hot air) Fh is discharged through the fan 224, guided by the front heat shielding plate 241, which also serves as a cooling air guide, to change the flow into a downward direction, and discharged from the air discharge port 94*a* of the under cover 94 toward the outside.

Since the direction of hot air Fh coming out from the radiator 221 is changed by the front heat shielding plate 241, the effect of hot air Fh on the engine 211 or the fuel tank 230 located behind the radiator 221 can be prevented. Since the front heat shielding plate 241 also serves as a cooling air guide, the provision of a separate cooling air guide is not necessary.

Figure 12:
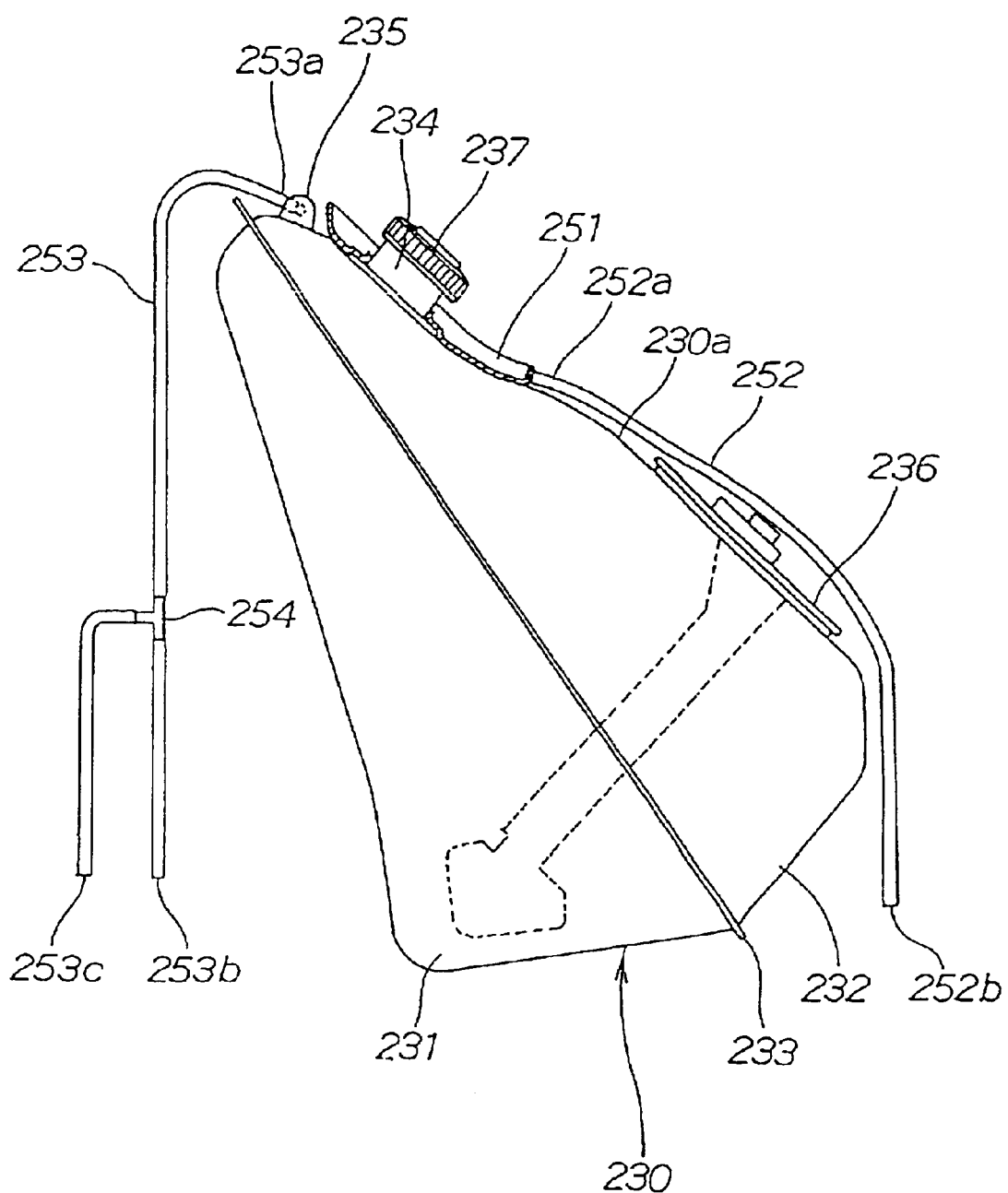
FIG. 12 is a diagrammatic sketch of the fuel tank of the motorcycle including a hinged lid structure for a vehicle according to the present invention mounted thereon.

FIG. 12 is a diagrammatic sketch of the fuel tank of the motorcycle including a hinged lid structure for a vehicle according to the present invention mounted thereon, showing a state in which the fuel tank 230 is provided with a tray 251 surrounding the oil filler port 234, one end 252*a* of the fuel discharge hose (drain hose) 252 is connected to the tray 251, and the other end 252*b* of the fuel discharge hose 252 is opened in the air.

An end 253*a* of the breather hose 253 is connected to the sub-tank 235 for a breather, and the other end of the breather hose 253 is bifurcated. The reference numeral 254 designates a T-joint for bifurcating the other end of the breather hose 253.

Figure 13:
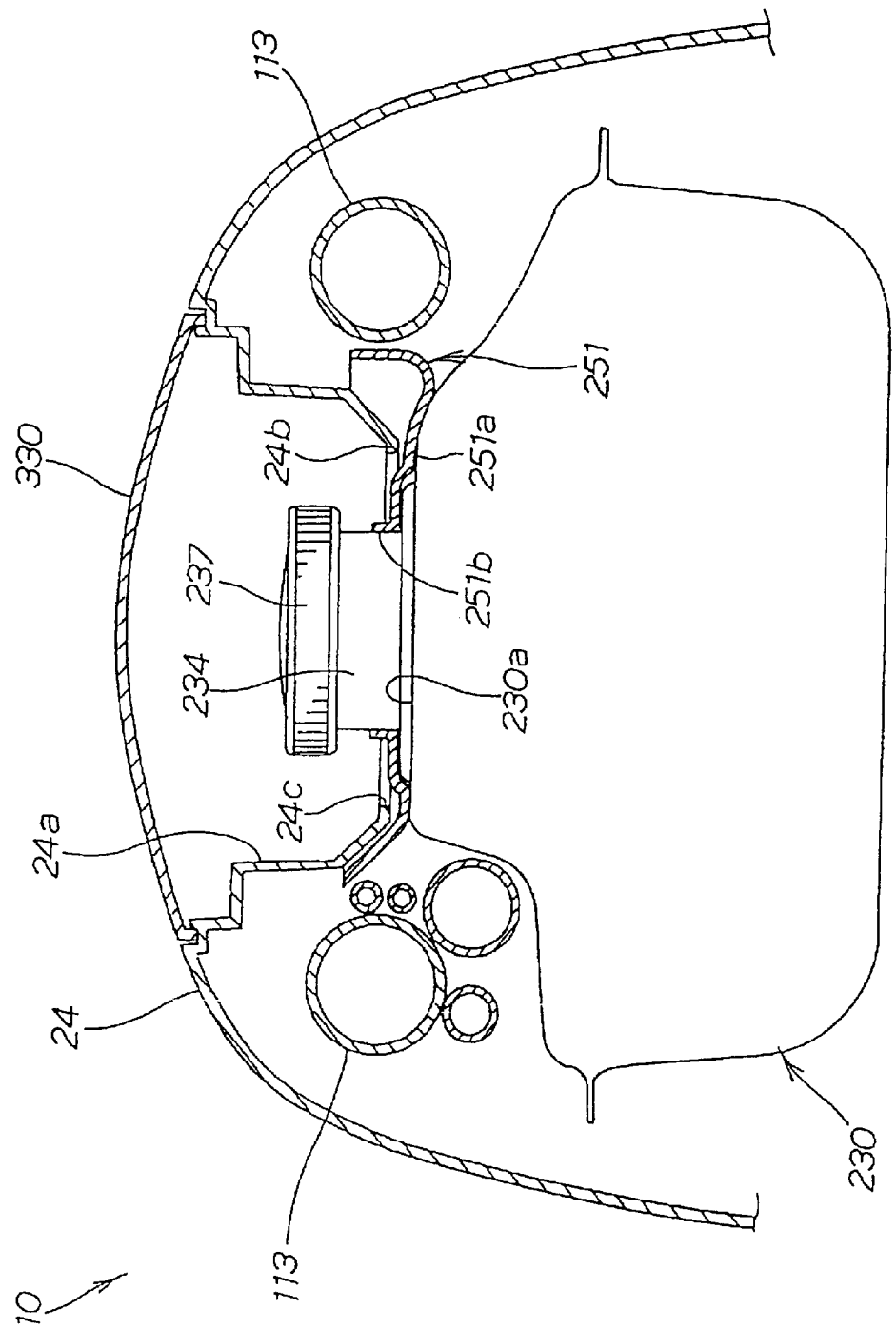
FIG. 13 is a sectional back view showing the oil filler port of the fuel tank and the parts thereabouts of the motorcycle including a hinged lid structure for a vehicle according to the present invention.

FIG. 13 is a sectional back view showing the oil filler port of the fuel tank and the parts therearound of the motorcycle including a hinged lid structure for a vehicle according to the present invention mounted thereon. The tray 251 is a fuel pan having a flat bottom 251*a* and a cylindrical portion 251*b* passing vertically therethrough formed in a single piece. The tray 251 can be mounted simply by inserting the cylindrical portion 251*b* into the oil filler port 234 and having the upper and lower surfaces of the bottom 251*a* captured between the bottom 24*b* of the recess 24*a* provided at the oil filling section of the center cover 24 and the upper surface 230*a* of the fuel tank 230. Therefore, the members such as bolts or the like for mounting the tray 251 are not necessary, and thus it may be mounted easily. A through hole 24*c* is provided for the oil filler port.

Figure 14:
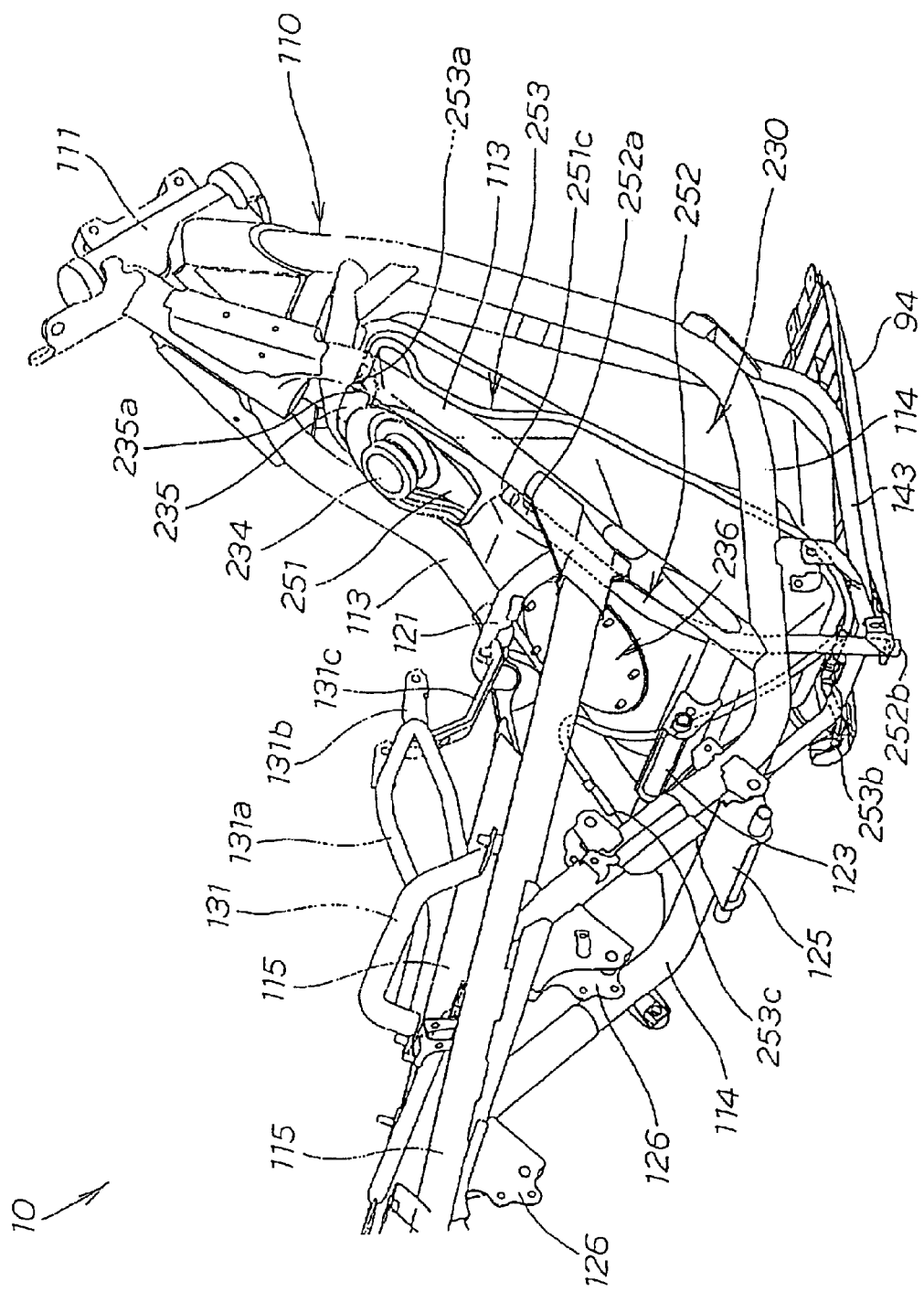
FIG. 14 is an outline view showing the right side of the fuel tank mounted on the vehicle body frame employing the hinged lid structure for a vehicle according to the present invention.

FIG. 14 is an outline view showing the right side of the fuel tank mounted on the vehicle body frame employing the hinged lid structure for a vehicle according to the present invention. The tray 251 comprises a discharge port 251*c* extending downwardly toward the rear. One end 252*a* of the fuel discharge hose 252 is connected to the discharge port 251*c*, and the fuel discharge hose 252 extends downwardly along the right upper frame 113 to the right end of the rear portion of the under cover 94, and the other end 252*b* is directed downwardly.

Fuel spilt around the oil filler port 234 during fueling into the fuel tank 230 may be collected on the tray 251 and discharged via the fuel discharge hose 252 to the outside. Therefore, spilt fuel will never be attached the exterior surface of the fuel tank.

On the other hand, the sub-tank 235 for a breather comprises a breather port 235*a* extending along the right side. The breather hose 253 is connected to the breather port 235*a* at one end 253*a* thereof and extends downwardly toward the rear along the right side of the fuel tank 230.

That is, when viewing the fuel tank 230 from the front, the breather hose 253 passes between the upper frame 113 and the down tube 114, and extends along the fuel tank 230 to the right end of the rear portion of the under cover 94, and then is bifurcated.

One end of the bifurcated branch 253*b* extends to the left end of the rear portion of the under cover 94 and is opened in the air, and the other end of the bifurcated branch 253*c* extends upwardly once along the rear surface of the fuel tank 230, and then rearward along the left upper frame 113, and is opened into the air.

Figure 15:
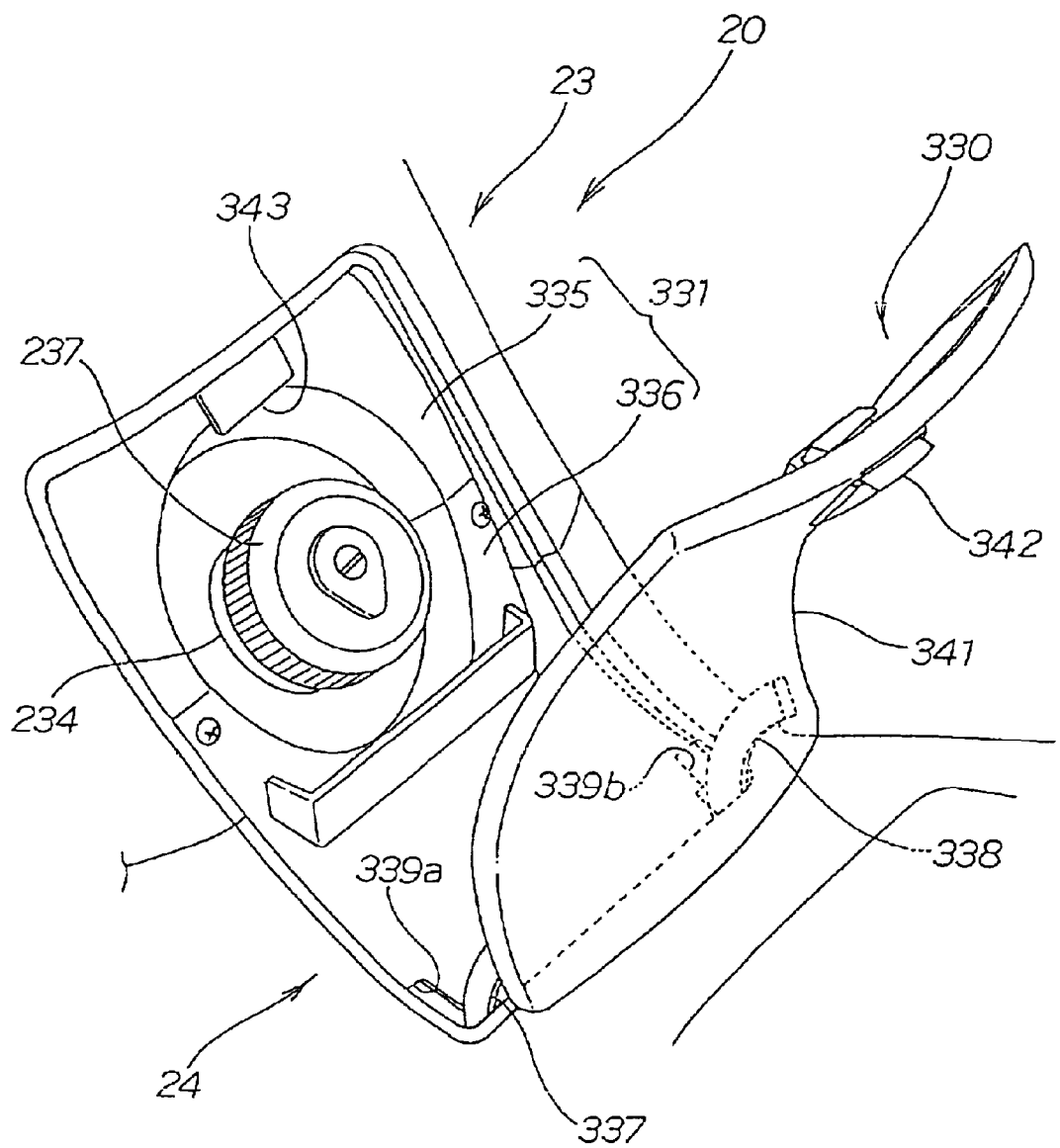
FIG. 15 is a perspective view of a lid for the oil filler port of the motorcycle including a hinged lid structure for a vehicle according to the present invention mounted thereon.

FIG. 15 is a perspective view of a lid for the oil filler port of the motorcycle including a hinged lid structure for a vehicle according to the present invention mounted thereon. The hinged lid structure for a vehicle means a structure comprising an oil filler tray section 331 in the form of recess or opening formed on the vehicle body cover 20, and a pair of hinges 333, 334 (See FIG. 16) for mounting the lid 330 for the oil filler port as a hinged lid on the oil filler tray section 331 so as to be capable of opening and closing freely. The vehicle body cover 20 and the lid for the oil filler port 330 are members made of synthetic resin.

The oil filler tray section 331 is constructed in such a manner that the front portion 335 of the oil filler tray, formed by cutting out a portion of the inner cover 23, which is a part of the vehicle body cover 20, corresponding to the oil filler port 234 and the rear portion 336 of the oil filler tray formed by cutting out a portion of the center cover 24, which is a part of the vehicle body cover 20, corresponding to the oil filler port 234, and the front portion 335 of the oil filler tray and the rear portion 336 of the oil filler tray are fitted together from the front and the rear. The rear portion 336 of the oil filler tray is provided with small through holes 339a, 339b for passing a pair of arms 337, 338.

The lid 330 for the oil filler port comprises a lid body 341, a lid opener 342 provided at the front end of the lid body 341 for engaging/disengaging the inner cover 23, and a pair of left and right arms 337, 338 extending from the rear end of the lid body 341. A locking portion 343 is provided for engaging the lid opener 342 formed on the inner cover 23.

Figure 16:
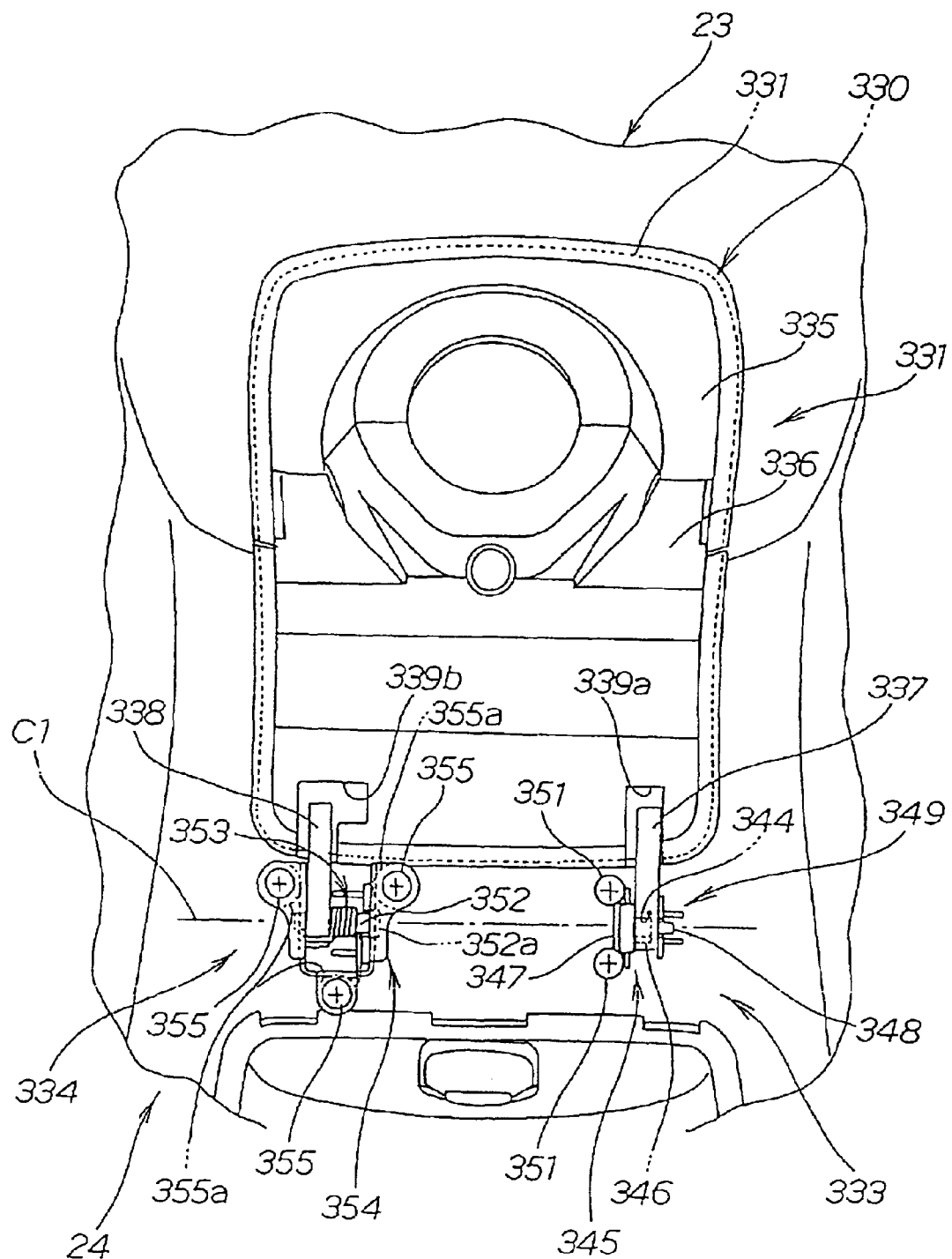
FIG. 16 is a rear elevation of the lid for the oil filler port of the motorcycle including a hinged lid structure for a vehicle according to the present invention mounted thereon.

FIG. 16 is a rear elevation of the lid for the oil filler port of the motorcycle including a hinged lid structure for a vehicle according to the present invention mounted thereon.

One of the hinges 333 comprises an internal gear 344 formed around the axis of rotation C1 of one of the arms 337, a gear 346 for rotary damper 345 which is in engagement with the internal gear 344 as a damper, a rib group 349 formed on the center cover 24 for supporting a housing 347 of the rotary damper 345, and set screws 351, 351 for tightening the housing 347 of the rotary damper 345 on the rib group 349.

The rotary damper 345 is a member constructed by rotatably mounting a gear 346 on the housing 347 and filling oil (not shown) in the housing 347 so as to provide a viscosity of rotation of the gear 346 for damping a speed of rotation and providing a smooth rotation of the lid 330 for an oil filler port by engagement between the gear 346 and the internal gear 344 of one of the arms 337 of the lid 330 for oil filler port. The one of the arms 337 is a member provided on the back face of the internal gear 344 with a shaft 348 for being supported by the rib group 349.

The other hinge 334 comprises a shank 352 formed around the axis of rotation C1 of the other arm 338, a torsion spring 353 as a spring member supported by the shank 352, a hinge holder 354 as a reinforcing plate accommodating the shank 352 and the torsion spring 353. A screw 352a is provided for rotatably mounting the shank 352 on the hinge holder 354. Setscrews 355 . . . are provided for securing the hinge holder 354 to the center cover 24. Bosses 355a are formed on the center cover 24 for screwing the setscrews 355 . . . therein.

The torsion spring 353 is a spring for urging the lid for the oil filler port 330 in the opening direction by being hooked at one end to the right arm 338 and at the other end to the hinge holder 354.

Figure 17:
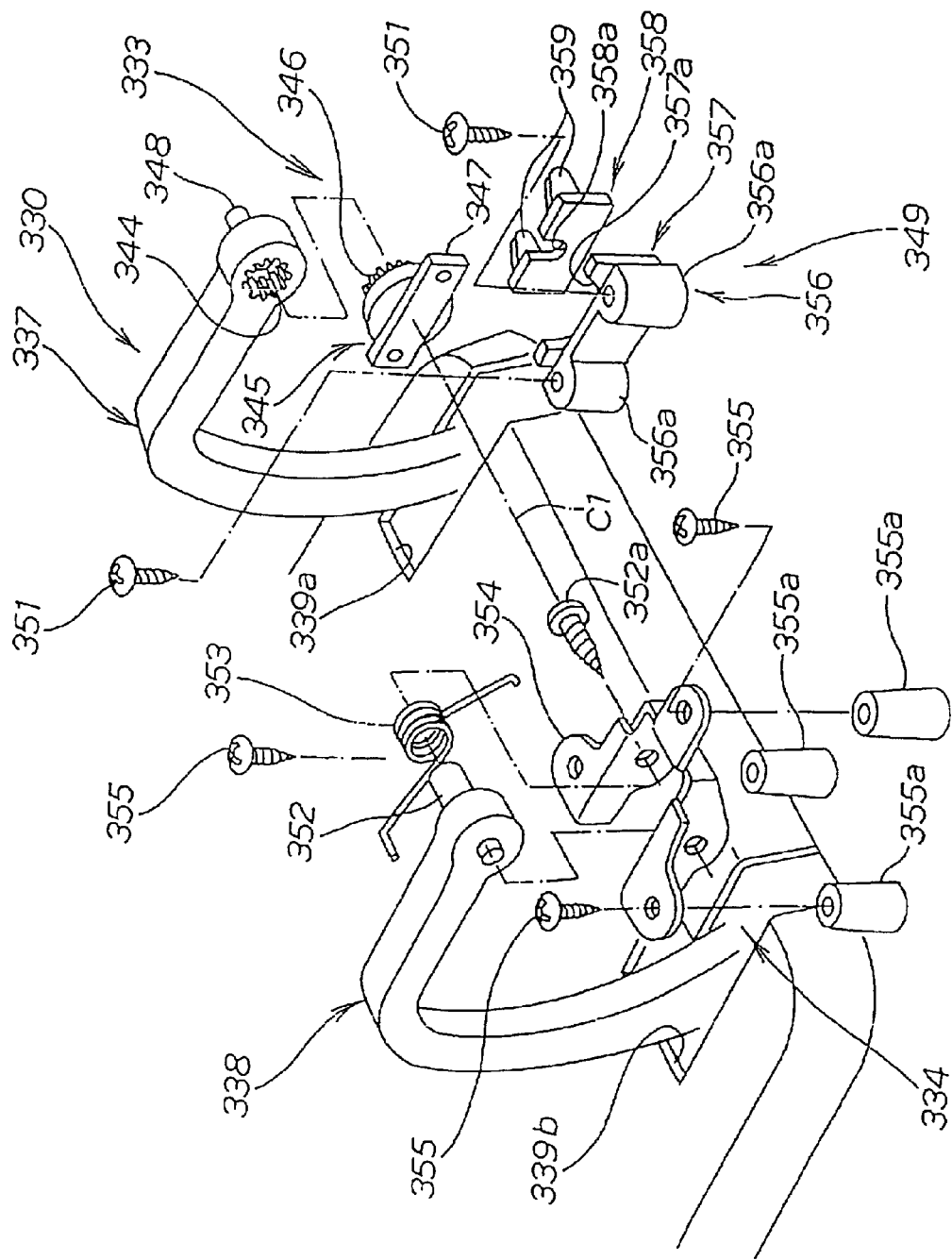
FIG. 17 is an exploded perspective view of the hinge structure of the motorcycle including a hinged lid structure for a vehicle according to the present invention mounted thereon.

FIG. 17 is an exploded perspective view of the hinge structure of the motorcycle including a hinged lid structure for a vehicle according to the present invention mounted thereon.

The rib group 349 comprises a first rib 356 having bosses 356a, 356a for screwing the setscrews 351, 351 therein, a second rib 357 having a semi-circular groove 357a for receiving the housing 347 of the rotary damper 345, a third rib 358 having a U-shaped groove 358a for supporting a shaft 348 extending from the back face of the internal gear 344, and reinforcing ribs 359, 359 for reinforcing the third rib 358a.

The hinged lid structure for a vehicle according to the present invention is, in brief, constructed by employing the rotary damper 345 having a gear 346 rotatably mounted on the housing 347, forming the internal gear 344 around the axis of rotation C1 of one of the arms 337, directly engaging the gear 346 with the internal gear 344, and fixing the housing 347 to the vehicle body cover 20 (See FIG. 15).

Formation of the internal gear 344 around the axis of rotation C1 of one of the arms 337, direct engagement between the gear 346 of the rotary damper 345 and the internal gear 344, and fixation of the housing 347 to the vehicle body cover 20 provide the rotary damper 345 with a capability of supporting the rotating portion of the lid for the oil filler port 330. The structure of the lid for the oil filler port 330 (the hinged lid for a vehicle) may be simplified by providing the rotary damper 345 with a capability of supporting the rotating portion of the lid for the oil filler port 330.

In other words, the cost of the lid for the oil filler port 330 nay be reduced, and simultaneously, the number of steps for assembling the lid for the oil filler port 330 may be reduced.

In the hinged lid structure for a vehicle according to the present invention mounted thereon, rigidity of the hinge 334 may be improved since the hinge 334 supporting the other arm 338 is fixed on the center cover 23 (vehicle body cover 20) via the hinge holder 354 (reinforcing plate).

Figure 18:
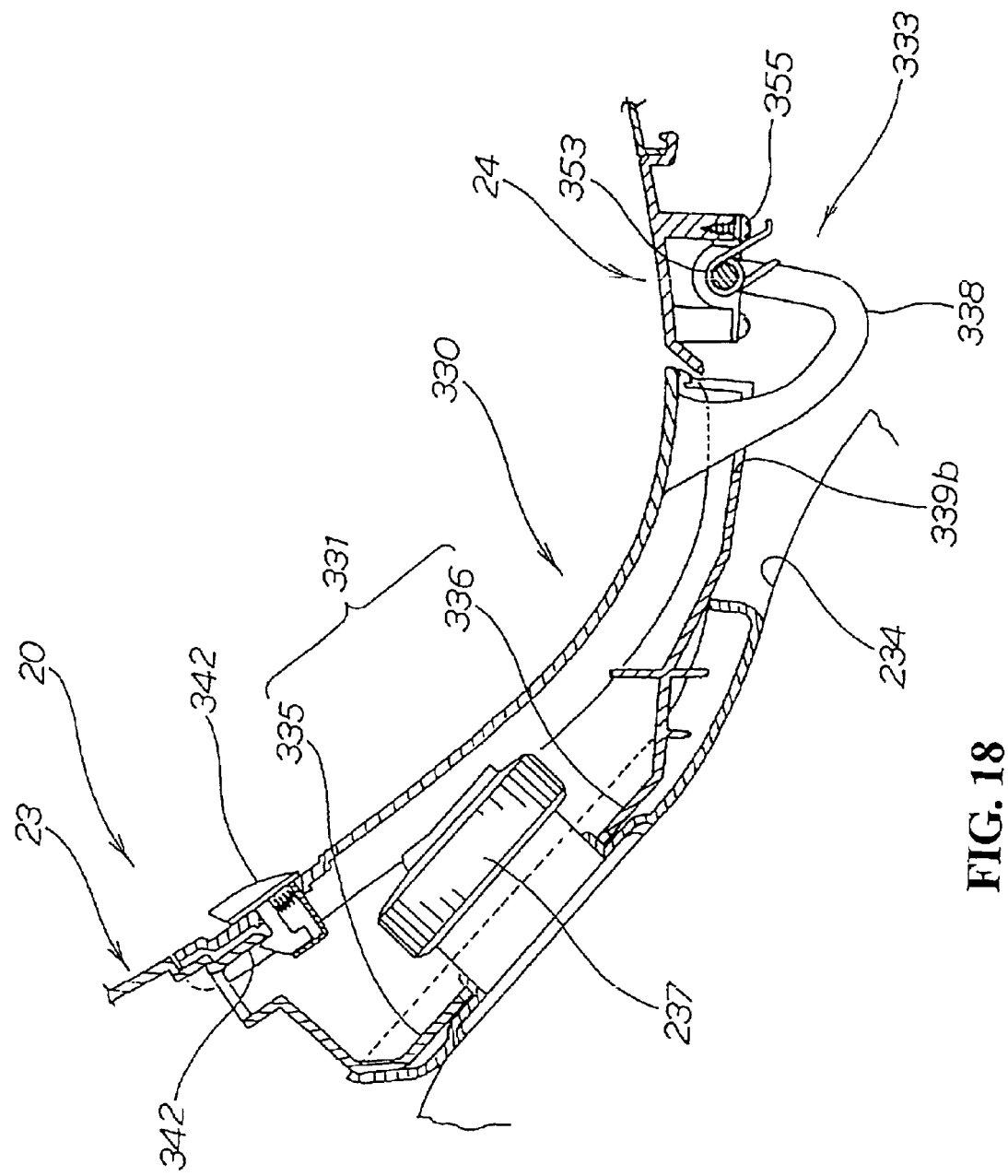
FIG. 18 is a sectional side elevation of the lid for the oil filler port of the motorcycle including a hinged lid structure for a vehicle according to the present invention mounted thereon.

FIG. 18 is a sectional side elevation of the lid for the oil filler port of the motorcycle including a hinged lid structure for a vehicle according to the present invention.

In other words, the hinged lid structure for a vehicle according to the present invention is a lid structure comprising the oil filler tray section 331 (recess or opening) provided on the vehicle body cover 20 of synthetic resin for covering the vehicle body frame 110 (See FIG. 3), and a lid for the oil filler port 330 (hinged lid) of synthetic resin for closing the oil filler tray section 331, wherein the pair of arms 337, 338 (See FIG. 17 for the reference numeral 337 on the near side) are extended from the lid for the oil filler port 330, these arms 337, 338 are rotatably mounted on the vehicle cover 20 via the hinges 333, 334 (See FIG. 17 for the reference numeral 333 on the near side), the hinge 334 for supporting one of the arms 338 is provided with a torsion spring 353 (spring member) for urging the lid 330 toward the opening direction. The hinge 333 supports the other arm 337 and is provided with a rotary damper 345 (See FIG. 17) for damping a speed of rotation of the lid 330.

For example, if it is possible to make the lid 330 open spontaneously, and to open and close the lid 330 with moderate motion, a hinged lid for a vehicle providing a feeling of operation suitable for a large scooter is realized.

Accordingly, a torsion spring 353 for urging the lid 330 in the opening direction is provided on the hinge 334 for supporting one of the arms 338, and a rotary damper 345 for damping a speed of rotation of the lid 330 is provided on the hinge 333 for supporting the other arm 337, so as to enable compact storage of the torsion spring 353 and the rotary damper 345 that are separately provided, and to realize a lid 330 being capable of spontaneously opening and of opening and closing with moderate motion. In other word, by releasing fixation of the lid 330, the lid 330 is opened to the fully opened position spontaneously by the action of the torsion spring 353, and while it is being opened, a speed of rotation of the lid 330 is damped by the rotary damper 345.

Consequently, the lid rotates smoothly with a natural motion, which gives an upscale image, and thus a hinged lid for a vehicle providing a feeling of operation suitable for, for example, the large scooter is provided.

With the hinged lid structure for a vehicle according to the present invention, a pair of small through holes 339a, 339b (See FIG. 15 for the numeral 339a on the near side) for passing the pair of arms 337, 338 are formed on the oil filler tray section 331, so that the through holes 339a, 339b may be concealed from the outside with the lid for the oil filler port 330 closed. Even when the lid for the oil filler port 330 is in the opened state, the through holes 339a, 339b are indistinctive because they are small, and thus the appearance of the portion around the lid for the oil filler port 330 may be improved.

The operation of the lid for the oil filler port 330 employing the hinged lid structure for a vehicle according to the present invention, that has been described thus far, will be described below.

Figure 19A:
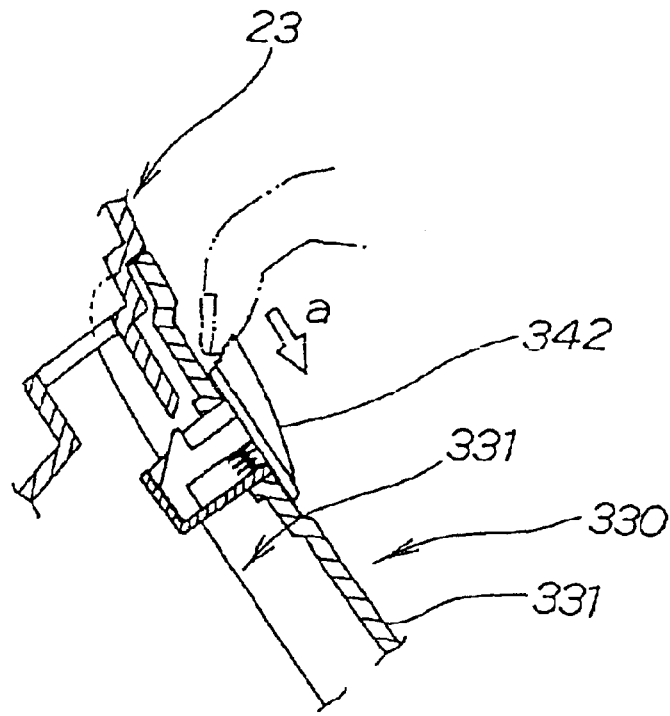
FIG. 19 is an explanatory drawing illustrating the operation of the lid for the oil filler port employed in the motorcycle including a hinged lid structure for a vehicle according to the present invention mounted thereon.
Figure 19B:
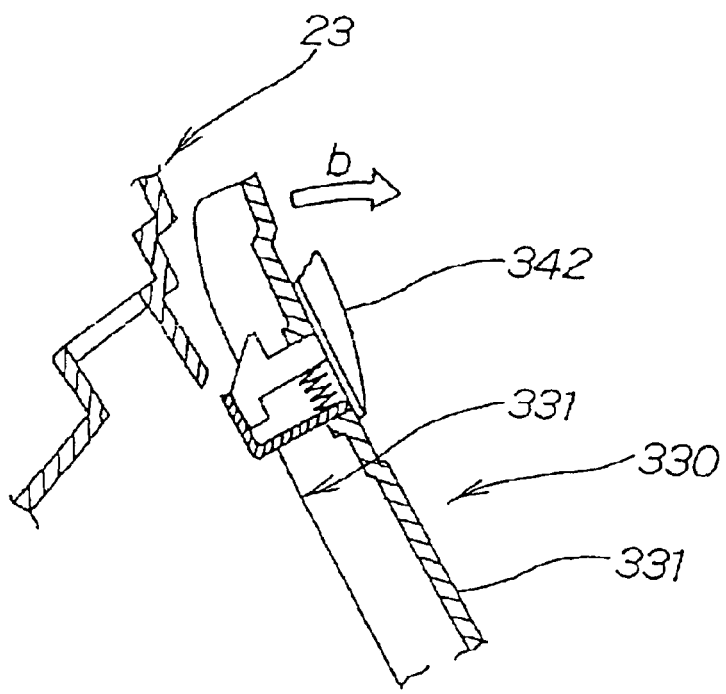

FIGS. 19(a) and 19(b) are explanatory drawings illustrating the operation of the lid for the oil filler port employed in the motorcycle including a hinged lid structure for a vehicle according to the present invention mounted thereon.

In FIG. 19(a), the lid opener 342 is removed from the center panel 23 by pulling the lid opener 342 with a finger as illustrated by the arrow a.

In FIG. 19(b), by releasing the finger shown in (a), the lid for the oil filler port 330 slowly starts rotating spontaneously and moved to the fully opened position.

Figure 20:
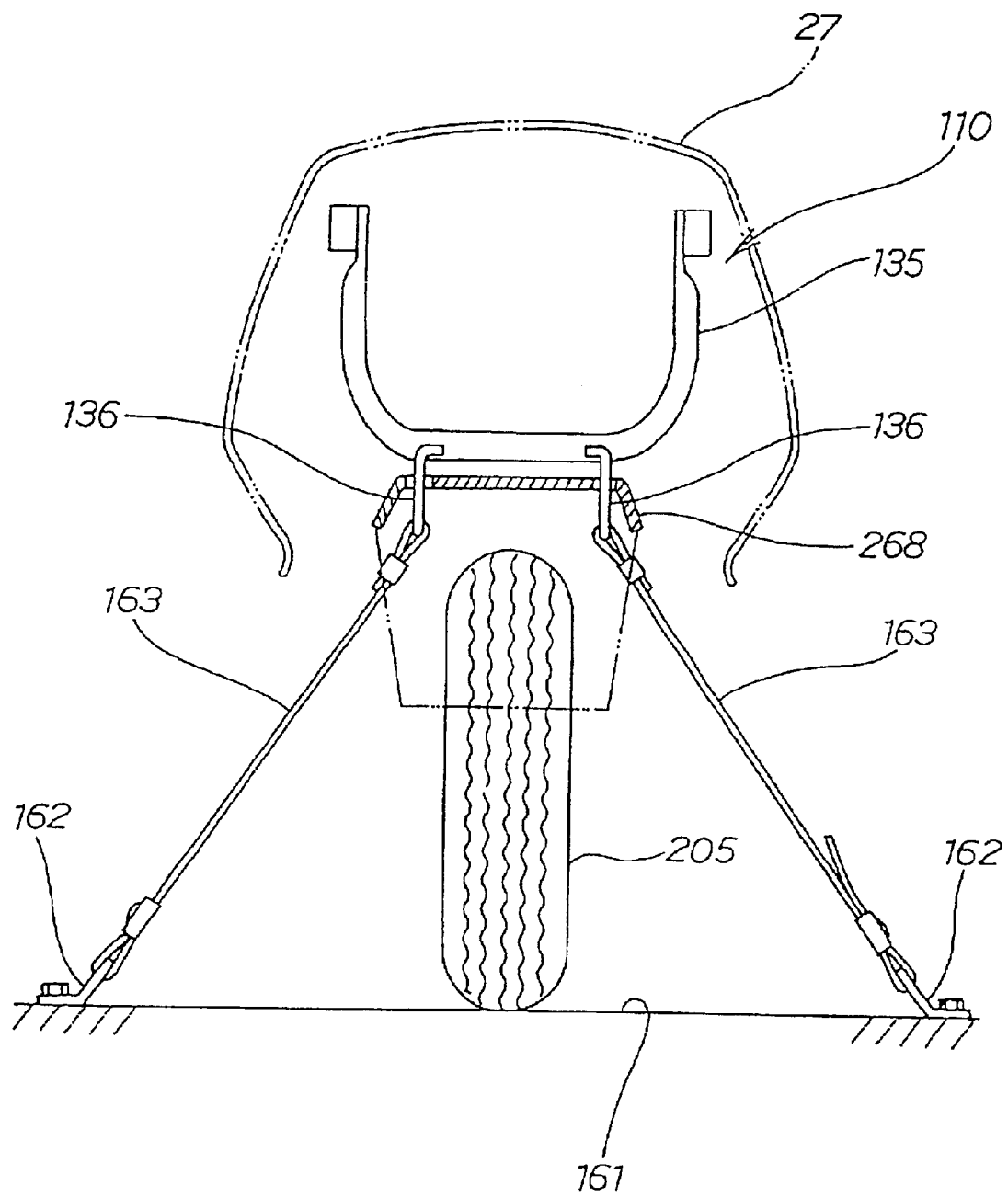
FIG. 20 is an explanatory drawing showing a carrier rope mounting structure for the vehicle body frame employing the hinged lid structure for a vehicle according to the present invention.

FIG. 20 is an explanatory drawing showing a carrier rope mounting structure for the vehicle body frame employing the hinged lid structure for a vehicle according to the present invention.

In FIG. 20, a loading platform 161 is provided with rope hooking members 162, 162 secured to the loading platform and carrier ropes 163, 163. The carrier rope mounting structure comprises carrier hooks 136, 136 mounted on the lower rear cross member of the vehicle body frame 110, extending along the rear fender 268 while being fully covered by the rear fender 268. Therefore, the carrier hooks 136, 136 cannot be seen while the vehicle is in travel, and thus the appearance of the motorcycle 10 (See FIG. ) may be improved. Since they are fully covered by the rear fender 268, the carrier hooks 136, 136 may be increased in size, and there is no danger for damaging the rear fender 268. In other words, hooking the carrier ropes 163, 163 on the vehicle body frame 110 may easily be done.

Figure 21:
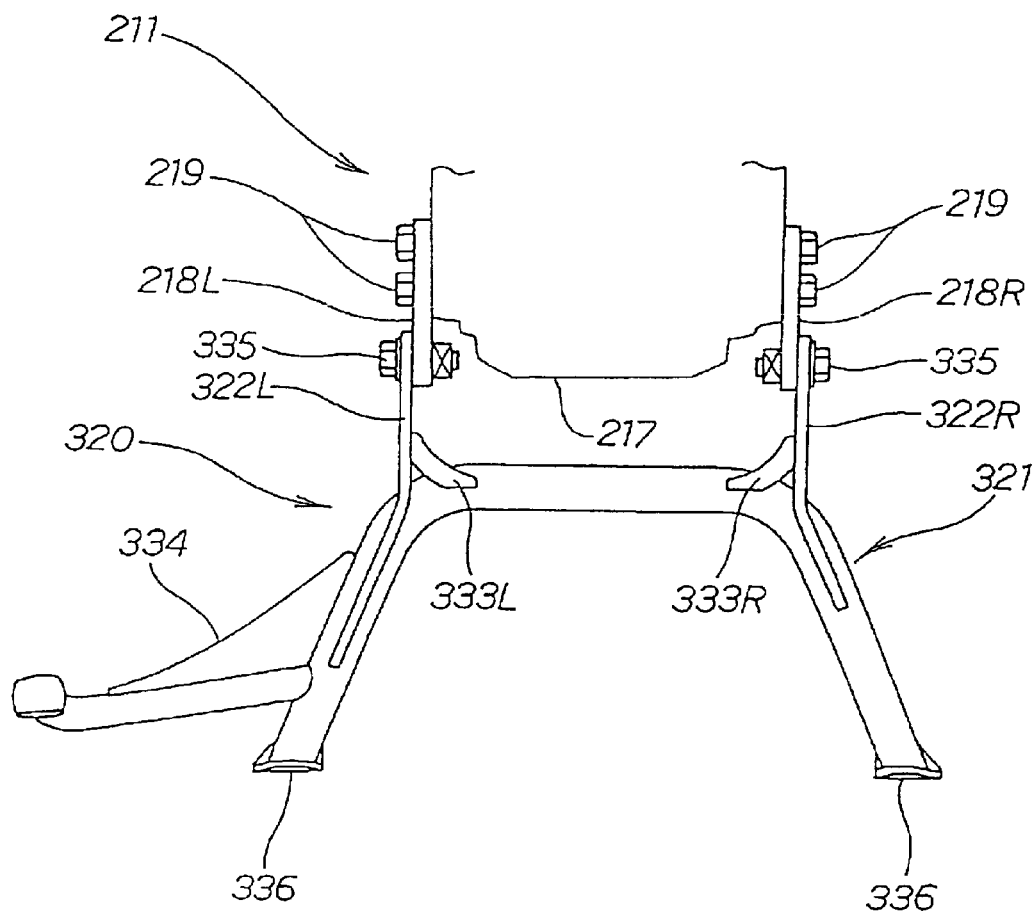
FIG. 21 is a side view of the main stand mounting structure for the motorcycle employing the hinged lid structure for a vehicle according to the present invention.

FIG. 21 is a side view of the main stand mounting structure for the motorcycle employing the hinged lid structure for a vehicle according to the present invention.

In FIG. 21, a crankcase 217 for the engine 211 is provided with left and right mounting brackets 218L, 218R mounted on the crankcase 217. Bolts 219 . . . are provided for fixing the left and right mounting brackets 218L, 218R onto the crankcase 217. The main stand 320 comprises a stand body 321 of an inverted angular U shape, left and right hinge stays 322L, 322R are mounted on the stand body 321. Reinforcing members 333L, 333R are laid between these hinge stays 322L, 322R and the stand body 321, respectively. A foothold 334 is mounted on the left side of the stand body 321. Pivot shafts 335, 335 are provided for journaling the main stand 320 on the left and right mounting brackets 218L, 218R, and the left and right grounding surfaces 336, 336 are provided of the stand body 321.

Figure 22:
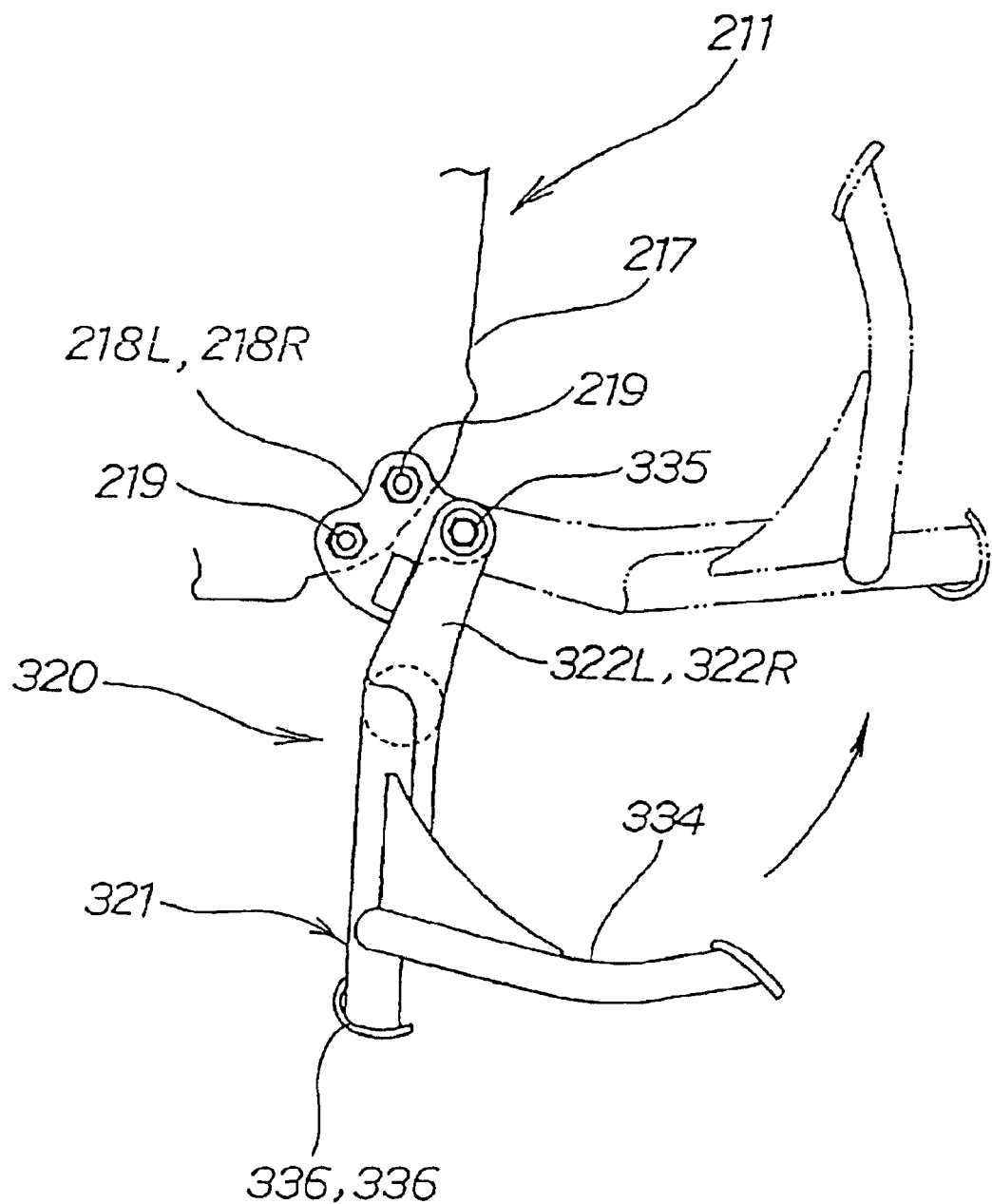
FIG. 22 is a side view of the main stand of the motorcycle employing the hinged lid structure for a vehicle according to the present invention.

FIG. 22 is a side view of the main stand of the motorcycle employing the hinged lid structure for a vehicle according to the present invention. The main stand mounting structure is constructed in such a manner that the left and right hinge stays 322L, 322R are journaled on the left and right mounting brackets 218L, 218R mounted on the crankcase 217 for a swinging motion.

Since the left and right hinge stays 322L, 322R are journaled on the left and right mounting brackets 218L, 218R of the crankcase 217 for a swinging motion, the distance from the grounding surfaces 336, 336 of the main stand to the pivot shaft may be reduced. For example, the cross member to be laid between the hinge stays 322L, 322R or the like may be omitted, and thus the cost of the main stand 320 may be reduced.

Figure 23:
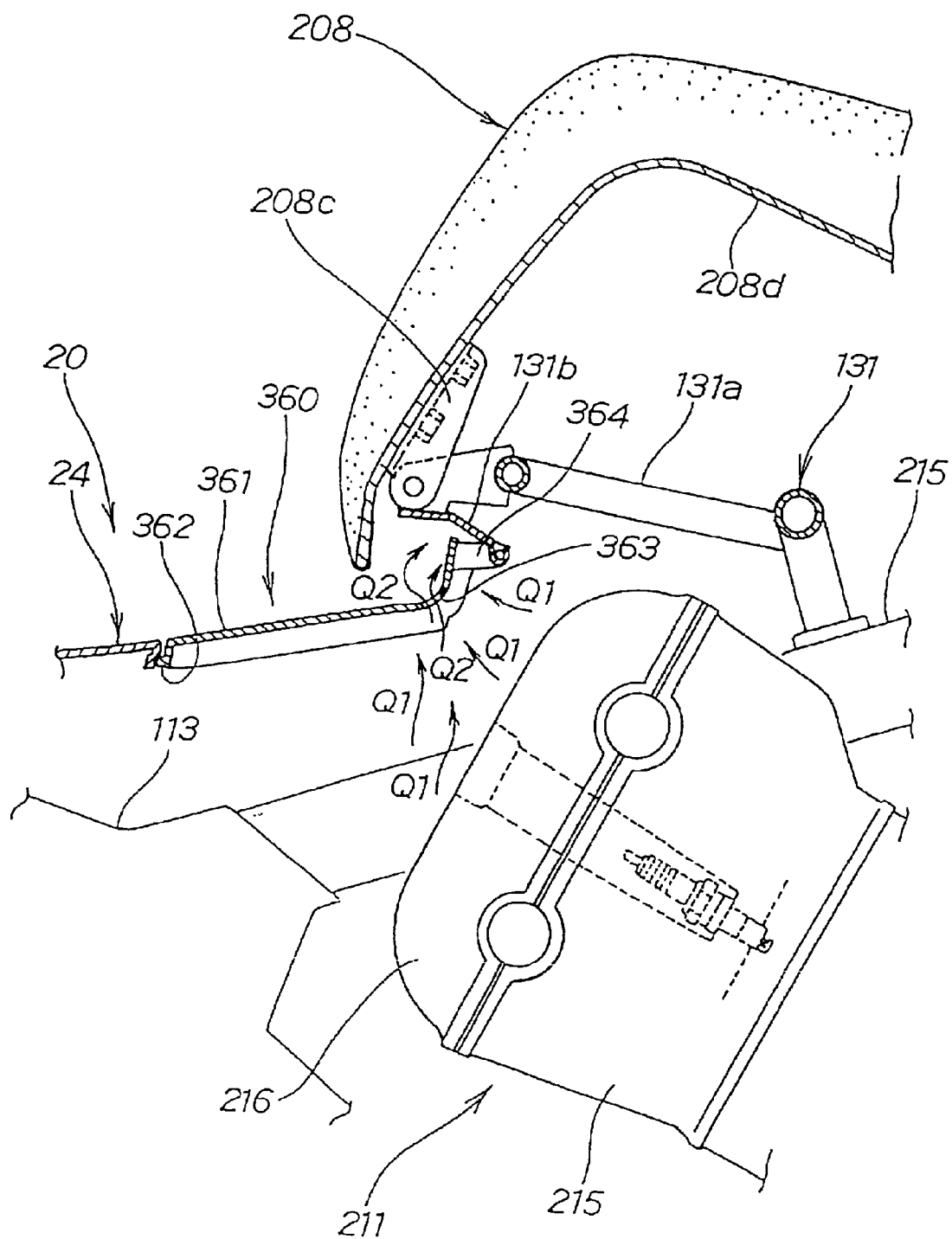
FIG. 23 is a sectional side elevation of the lid for inspection and the parts thereabouts of the motorcycle employing the hinged lid structure for a vehicle according to the present invention.

FIG. 23 is a sectional side elevation of the lid for inspection and the parts therearound of the motorcycle employing the hinged lid structure for a vehicle according to the present invention. The lid for inspection 360 comprises a lid body 361, a front locking portion 362 formed on the lid body 361 for being caught under the center cover 24, and a rear locking portion 364 formed on the lid body 361 for hooking on the seat hinge supporting portion 131b, and a relief hole 363 formed on the lid body 361 for passing and releasing heat from the engine rearward.

In the large scooter type vehicle, heat generation in the engine 211 is significant, and thus heat discharging measure has to be taken to details.

Accordingly, a relief hole 363 for concentrating the heat flow to the lid for inspection 360 for inspecting the engine 211 is formed to introduce heat Q1 . . . generated at the engine 211 toward the seat bottom 208d as illustrated by the arrow Q2 and release the heat rearward by utilizing air blowing thereon during travel. Therefore, hot air around the engine 211 may be prevented from staying in the vehicle body cover 20.

When inspecting the engine 211, the lid for inspection 360 is removed for performing inspection.

Figure 24:
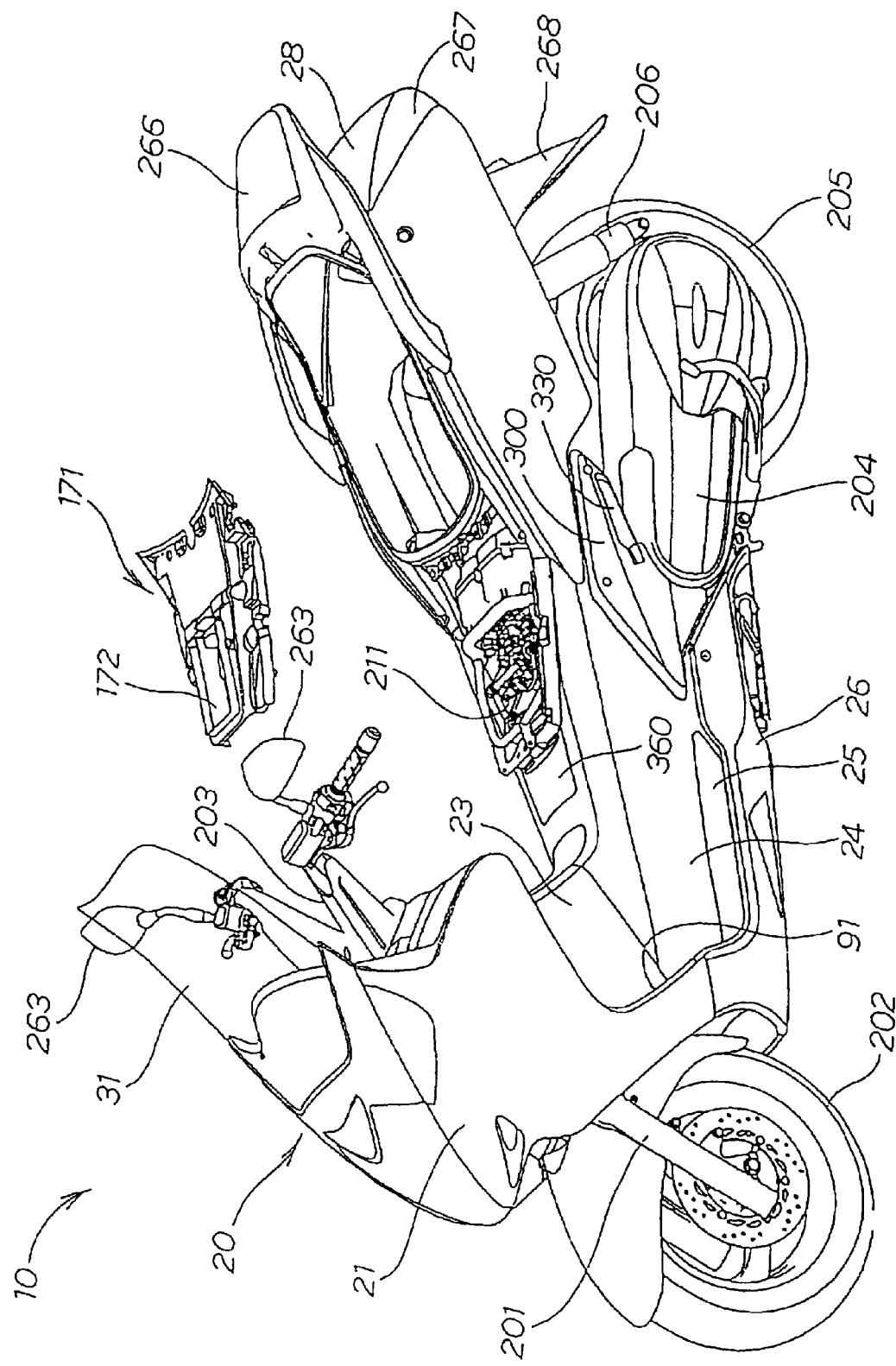
FIG. 24 is an exploded perspective view showing the under-the-seat heat insulating structure of the motorcycle employing the hinged lid structure for a vehicle according to the present invention.

FIG. 24 is an exploded perspective view showing the under-the-seat heat insulating structure of the motorcycle employing the hinged lid structure for a vehicle according to the present invention. The under-the-seat heat insulating structure means an alignment of the under-the-seat tray 171 that is to be detachably mounted above the engine 211 for insulating heat generated at the engine 221 as well as for storing the tools (not shown). A tool storage section 172 is formed in the under-the-seat tray 171.

Figure 25:
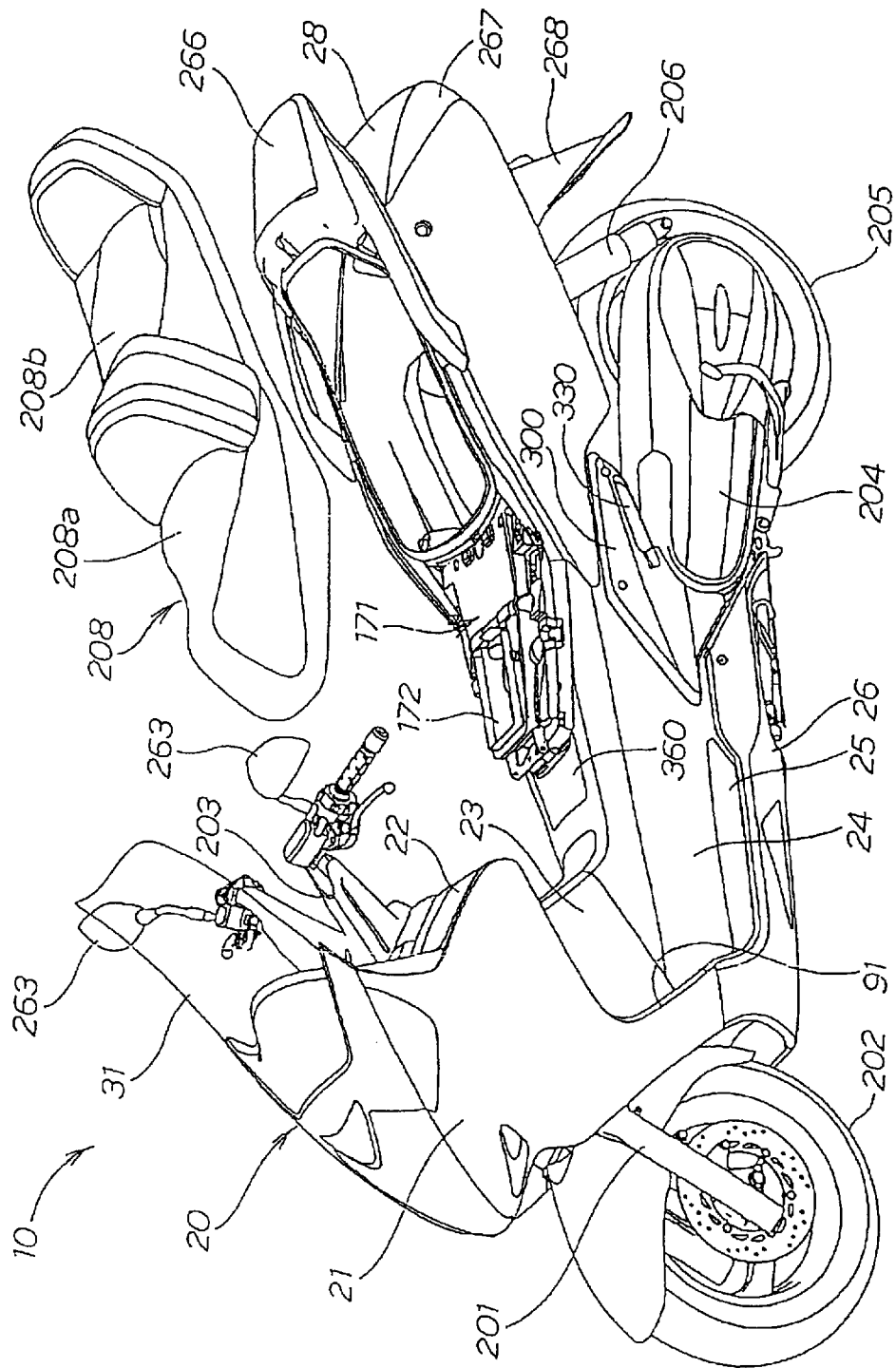
FIG. 25 is a perspective view showing how to mount the under-the-seat tray on the motorcycle employing the hinged lid structure for a vehicle according to the present invention.

FIG. 25 is a perspective view showing how to mount the under-the-seat tray on the motorcycle employing the hinged lid structure for a vehicle according to the present invention.

For example, if heat generated at the engine 211 is insulated by integrally covering the upper portion of the engine 211 (See FIG. 24) by a luggage box or the like, it becomes a hindrance for inspection around the engine 211. Providing a special heat shielding plate for insulating heat generated at the engine 211 increases the number of the components.

Accordingly, heat generated at the engine is insulated by arranging the under-the-seat tray 171 above the engine 211. In addition, the tool storing section 172 is formed in the under-the-seat tray 171 for enabling storage of tools (not shown). Providing the under-the-seat tray 171 above the engine 211 and under the seat 208 detachably on the vehicle body cover 20 does not impair the workability of the inspection around the engine 211.

In other words, providing the under-the-seat tray 171 with heat insulating capability and storing capability, and detachably mounting the same on the vehicle body cover 20 may realize multi-functioning and improve workability of inspection.

In the embodiment, as shown in FIG. 4, three cross members of the front cross member 131, the middle cross member 132 and the rear cross member 133 are laid between the rear frames 115, 115. However, it is not limited thereto, and the number of the cross members to be laid between the rear frames may be selected as needed.

The present invention in this construction provides the following advantages.

According to the first aspect of the present invention, a hinged lid structure for a vehicle is provided that provides a lid structure for closing a recess or an opening formed on a vehicle body cover of synthetic resin for covering the vehicle body frame with a hinged lid of synthetic resin. A pair of arms extend from the hinged lid with the pair of arms being rotatably mounted on the vehicle body cover via hinges. A damper is attached on one of the hinges that supports one of the arms for damping a speed of rotation. A spring member is attached on the other hinge that supports the other arm for urging the lid in the opening direction.

Thus, the present invention provides a lid that is capable of spontaneously opening and closing with a moderate motion. In other words, by releasing the lid, the lid is opened to the fully opened position spontaneously by the action of the spring member, and while it is being opened, the speed of rotation of the lid is damped by the damper. Consequently, the lid rotates smoothly with a natural motion, giving an upscale image.

The second aspect of the present invention provides for a rotary damper with a housing and a gear rotatably mounted on the housing, and an internal gear formed on one of the arms about the axis of rotation thereof. The gear directly engaged with the internal gear and the housing is secured to the vehicle body cover.

The damper supports the rotary portion of the hinged lid for a vehicle by having the internal gear on one of the arms about the axis of rotation, directly engaging a gear with the internal gear, and securing the housing on the vehicle body cover. By enabling the damper to support the rotary portion of the hinged lid for a vehicle, the hinged lid structure for a vehicle may be simplified. In other words, the cost of the hinged lid for a vehicle is reduced, and simultaneously, the number of steps required for assembling the hinged lid for a vehicle may be reduced as well.

The third aspect of the present invention provides that the hinge for supporting the other arm is secured to the vehicle body cover via a reinforcing plate. As a result, rigidity of the hinge is improved by securing the hinge for supporting the other arm on the vehicle body cover via the reinforcing plate.

The fourth aspect of the present invention provides a structure whereby the hinged lid is a lid for the oil filler port for covering the oil filler port of the fuel tank, the recess or the opening is a oil filler tray section formed integrally with the vehicle body cover, and a pair of small through holes for passing the pair of left and right arms are formed on the oil filler tray section. Since the pair of small through holes for passing the pair of arms are formed on the oil filler tray section, the through holes may be concealed from the outside with the lid for the oil filler port closed. As a result, even when the lid for the oil filler port is opened, the through holes are nearly indistinguishable because they are small. Thus the appearance of the portion around the lid for the oil filler port is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hinged lid structure for a vehicle for closing a recess or an opening formed on a vehicle body cover of synthetic resin for covering the vehicle body frame with a hinged lid of synthetic resin, comprising:
    a first arm and a second arm extending from the hinged lid, the arms being rotatably mounted on the vehicle body cover via hinges;
    a damper attached on one of the hinges that supports the first arm for damping a speed of rotation of the lid, the damper having a gear rotatably mounted on a housing, the gear directly engaging an internal gear formed around an axis of rotation of the first arm; and
    a spring member attached on the other hinge that supports the second arm for urging the lid in the opening direction, the spring member being mounted on a shank of the second arm.

2. The hinged lid structure for a vehicle according to claim 1, wherein
    the housing is secured between two parts of a rib group, one part of the rib group being attached to the vehicle body cover, thereby fixing the first arm to the vehicle body cover.

3. The hinged lid structure for a vehicle according to claim 1, wherein the hinge for supporting the second arm is secured to the vehicle body cover via a reinforcing plate.

4. The hinged lid structure for a vehicle according to claim 1, wherein the hinged lid is a lid for the oil filler port formed for covering the oil filler port of the fuel tank;
    said recess or the opening is an oil filler tray section being formed integrally with the vehicle body cover; and
    a pair of small through holes for passing the first arm and the second arm are formed on the oil filler tray section.

5. The hinged lid structure for a vehicle according to claim 2, wherein said rotary damper supports the hinged lid in an opened condition.

6. The hinged lid structure for a vehicle according to claim 1, wherein the arms are rotatably mounted to an underside of a center cover of the vehicle.

7. The hinged lid structure for a vehicle according to claim 2, wherein the housing is sandwiched between two parts of the rib group.

8. The hinged lid structure for a vehicle according to claim 3, wherein the reinforcing plate is U-shaped.

9. A hinged lid structure for a vehicle for closing an opening formed in a vehicle body comprising:
    a hinged lid;
    a first arm and a second arm extending from the hinged lid;
    a first hinge and a second hinge mounted on said vehicle body for rotatably mounting said arms relative thereto;
    a damper attached on the hinge that supports the first arm for damping a speed of rotation of the lid, the damper having a gear rotatably mounted on a housing, the gear directly engaging an internal gear formed around an axis of rotation of the first arm; and
    a spring member attached on the second hinge that supports the second arm for urging the lid in the opening direction, the spring member being mounted on a shank of the second arm.

10. The hinged lid structure for a vehicle according to claim 9, wherein
    the housing is secured between two parts of a rib group, one part of the rib group being attached to the vehicle body cover, thereby fixing the first arm to the vehicle body cover.

11. The hinged lid structure for a vehicle according to claim 9, wherein the second hinge for supporting the second arm is secured to the vehicle body cover via a reinforcing plate.

12. The hinged lid structure for a vehicle according to claim 9, wherein the hinged lid is a lid for the oil filler port formed for covering the oil filler port of the fuel tank;

said opening is an oil filler tray section being formed integrally with the vehicle body cover; and a pair of small through holes for passing the first arm and the second are formed on the oil filler tray section.

13. The hinged lid structure for a vehicle according to claim 10, wherein said rotary damper supports the hinged lid in an opened condition.

14. The hinged lid structure for a vehicle according to claim 9, wherein the arms are rotatably mounted to an underside of a center cover of the vehicle.

15. The hinged lid structure for a vehicle according to claim 10, wherein the housing is sandwiched between two parts of the rib group.

16. The hinged lid structure for a vehicle according to claim 11, wherein the reinforcing plate is U-shaped.

17. A hinged lid structure for a vehicle for closing a recess or an opening formed on a vehicle body cover of synthetic resin for covering the vehicle body frame with a hinged lid of synthetic resin, comprising:

a first arm and a second arm extending from the hinged lid, the pair of arms being rotatably mounted on the vehicle body cover via hinges;

a damper attached on one of the hinges that supports the first arm for damping a speed of rotation of the lid;

a spring member attached on the other hinge that supports the second arm for urging the lid in the opening direction, wherein the hinge for supporting the second arm is secured to the vehicle body cover via a reinforcing plate, and wherein the spring member is a torsion spring hooked at one end to the second arm and at an opposite end to the reinforcing plate.

18. The hinged lid structure for a vehicle according to claim 17, wherein the damper is a rotary damper includes a housing and a gear rotatably mounted on the housing;

an internal gear is formed on the first arm about the axis of rotation thereof, the gear on the housing is directly engaged with the internal gear on the first arm; and the housing is secured between two parts of a rib group, one part of the rib group being attached to the vehicle body cover, thereby fixing the first arm to the vehicle body cover.

* * * * *